(12) United States Patent
Chao

(10) Patent No.: US 6,487,213 B1
(45) Date of Patent: Nov. 26, 2002

(54) METHODS AND APPARATUS FOR FAIRLY ARBITRATING CONTENTION FOR AN OUTPUT PORT

(75) Inventor: Hung-Hsiang Jonathan Chao, Holmdel, NJ (US)

(73) Assignee: Polytechnic University, Brooklyn, NY (US)

( * ) Notice: Subject to any disclaimer, the term of this patent is extended or adjusted under 35 U.S.C. 154(b) by 0 days.

(21) Appl. No.: 09/224,703

(22) Filed: Jan. 4, 1999

Related U.S. Application Data
(60) Provisional application No. 60/070,404, filed on Jan. 5, 1998.

(51) Int. Cl.[7] .............................................. H04L 12/56
(52) U.S. Cl. ......................................... 370/418; 370/428
(58) Field of Search ................................ 370/230, 256, 370/386, 388, 389, 390, 395.1, 395.42, 408–410, 412, 414, 415, 418, 422, 428, 429, 449, 461; 710/317

(56) References Cited

U.S. PATENT DOCUMENTS

| | | | | |
|---|---|---|---|---|
| 5,053,942 A | * | 10/1991 | Srini | ........................... 710/317 |
| 5,301,333 A | * | 4/1994 | Lee | ........................... 340/825.5 |
| 5,666,488 A | * | 9/1997 | Joh | ........................... 370/431 |
| 6,141,731 A | * | 10/2000 | Beardsley et al. | .......... 711/133 |
| 6,222,851 B1 | * | 4/2001 | Petry | ........................... 370/447 |

FOREIGN PATENT DOCUMENTS

GB  2261131 A  * 5/1993

* cited by examiner

*Primary Examiner*—Hassan Kizou
*Assistant Examiner*—Ahmed Elallam
(74) *Attorney, Agent, or Firm*—Straub & Pokotylo; John C. Pokotylo

(57) ABSTRACT

A hierarchical arbitration method in which requests are grouped, using a logical OR operation for example, and provided to higher levels of the hierarchy. Then, grant signals from higher levels of the hierarchy are either propagated down through each level of the hierarchy where they are used to modify, using a logical AND operation for example, grant signals. Alternatively, grant signals from all higher levels of the hierarchy may be provided to a leaf layer of the hierarchy where they are all used to modify, using a logical AND operation for example, grant signals.

31 Claims, 21 Drawing Sheets

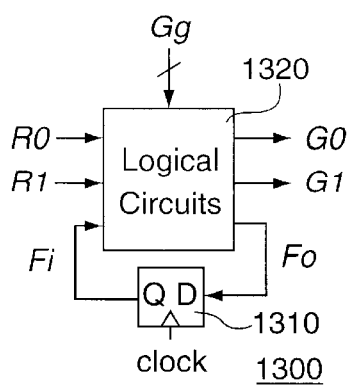
Gg
1320
R0 → Logical → G0
R1 → Circuits → G1
Fi ← Fo
Q D
1310
clock 1300
R0 : Request 0
R1 : Request 1
G0 : Grant signal 0
G1 : Grant signal 1
Fi : Flag input
Fo : Flag output
Gg : group Grant
True Table
| Input | | | Output | | |
|---|---|---|---|---|---|
| R0 | R1 | Fi | G0 | G1 | Fo |
| 0 | 0 | 0 | 0 | 0 | 0 |
| 0 | 0 | 1 | 0 | 0 | 1 |
| 0 | 1 | 0 | 0 | 1 | 0 |
| 0 | 1 | 1 | 0 | 1 | 0 |
| 1 | 0 | 0 | 1 | 0 | 1 |
| 1 | 0 | 1 | 1 | 0 | 1 |
| 1 | 1 | 0 | 1 | 0 | 1 |
| 1 | 1 | 1 | 0 | 1 | 0 |
(when all Gg inputs are 1)
FIGURE 13A
FIGURE 13B
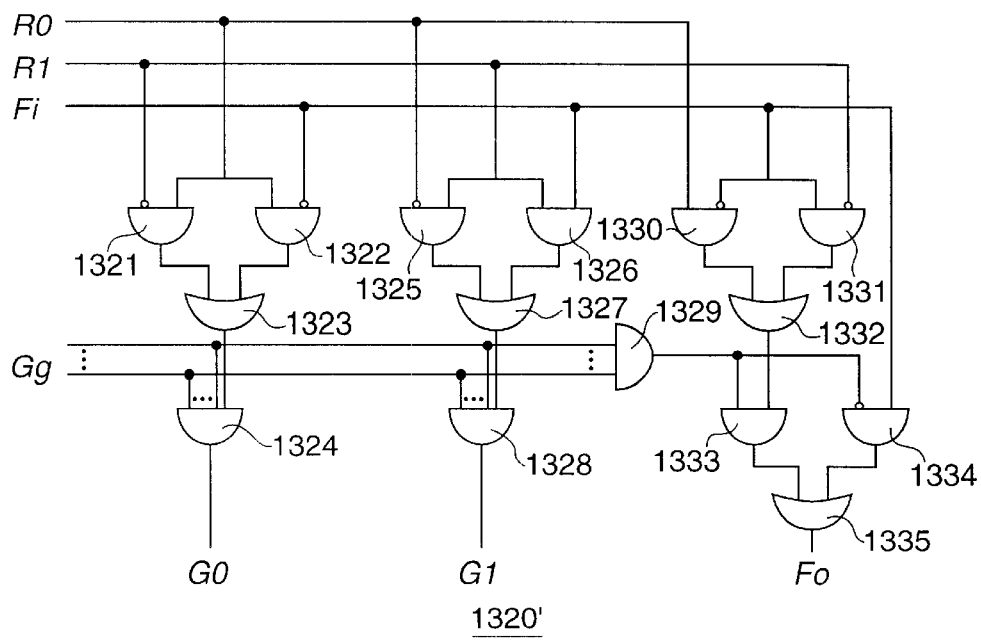
FIGURE 13C

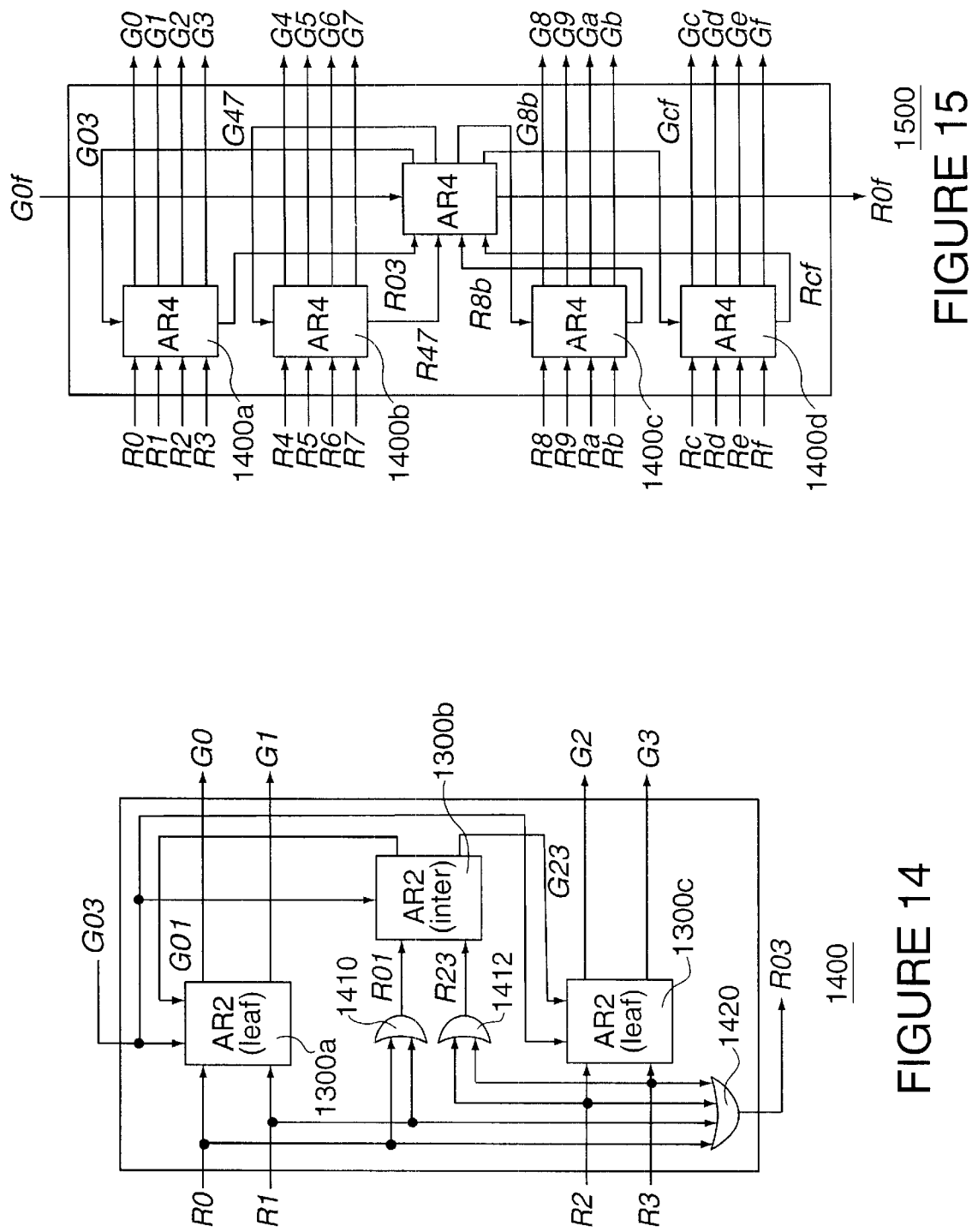

METHODS AND APPARATUS FOR FAIRLY ARBITRATING CONTENTION FOR AN OUTPUT PORT

§1. CLAIM TO PRIORITY

Benefit is claimed, under 35 U.S.C. §119(e)(1), to the filing date of provisional patent application serial No. 60/070,404, entitled "A FAST HIERARHICAL ARBITRATION SCHEME FOR MULTICAST PACKET SWITCHES", filed on Jan. 5, 1998 and listing Hung-Hsiang J. Chao as the inventor, for any inventions enclosed in the manner provided by U.S.C. §112, ¶1. This provisional application is expressly incorporated herein by reference.

§2. BACKGROUND OF THE INVENTION

§2.1 Field of the Invention

In general, the present invention concerns methods and apparatus for arbitrating contention for an output port of a switch (for switching ATM cells for example) or router (for routing TCP/IP packets for example).

§2.2 Related Art

The present invention concerns arbitrating port contention which often occurs when data is directed through a network or internetwork via switches or routers. Before addressing the arbitration techniques of the present invention, a brief description of the emergence of packet switching is provided in §2.2.1 below. Popular data structures used when communicating data are described in §§2.2.1.1.1 and 2.2.1.2.1 below. The basic elements and operations of switches or routers, which are used to direct data through a network or internetwork, are described in §§2.2.1.1.2 and 2.2.1.2.2 below. The idea of prioritizing data communicated over a network or internetwork is introduced in §2.2.2 below. Finally, with all of the foregoing background in mind, the problem of arbitrating port contention in switches and routers, as well as shortcomings of known arbitration techniques, are described in §2.2.3 below.

§2.2.1 The Growth of Network and Internetwork Communications

Communications networks permit remote people or machines to communicate voice or data (also referred to as "traffic" or "network traffic"). These networks continue to evolve to meet new demands placed upon them. A brief history of communications networks, and the emergence of packet switching, is now presented.

The public switched telephone network (or "PSTN") was developed to carry voice communications to permit geographically remote people to communicate with one another. Modems then came along, permitting computers to communicate data over the PSTN. Voice and modem communications over the PSTN use "circuit switching". Circuit switching inherently involves maintaining a continuous real time communication channel at the full channel bandwidth between two points to continuously permit the transport of information throughout the duration of the call. Unfortunately, due to this inherent characteristic of circuit switching, it is inefficient for carrying "bursty" data traffic. Specifically, many services have relatively low information transfer rates—information transfer occurs as periodic bursts. Bursty communications do not require full channel bandwidth at all times during the duration of the call. Thus, when circuit switched connection is used to carry bursty traffic, available communication bandwidth occurring between successive bursts is simply wasted.

Moreover, circuit switching is inflexible because the channel width is always the same. Thus, for example, a wide (e.g., 140 Mbit/second) channel would be used for all transmissions, even those requiring a very narrow bandwidth (e.g., 1 Kbit/second). In an attempt to solve the problem of wasted bandwidth occurring in circuit switching, multi-rate circuit switching was proposed. With multi-rate circuit switching, connections can have a bandwidth of a multiple of a basic channel rate (e.g., 1 Kbit/second). Although multi-rate circuit switching solves the problem of wasted bandwidth for services requiring only a narrow bandwidth, for services requiring a wide bandwidth, a number of multiple basic rate channels must be synchronized. Such synchronization becomes extremely difficult for wide bandwidth services. For example, a 140 Mbit/second channel would require synchronizing 140,000 1 Kbit/second channels. Moreover, multi-rate circuit switching includes the inherent inefficiencies of a circuit switch, discussed above, when bursty data is involved.

Multi-rate circuit switching having multiple "basic rates" has also been proposed. Unfortunately, the switch for multi-rate circuit switching is complex. Furthermore, the channel bandwidths are inflexible to meet new transmission rates. Moreover, much of the bandwidth might be idle when it is needed. Lastly, multiple basic rate circuit switching includes the inherent inefficiencies of a circuit switch, discussed above, when bursty data is involved.

In view of the above described problems with circuit switching, packet switched communications have become prevalent and are expected to be used extensively in the future. Two (2) communications protocols—TCP/IP and ATM—are discussed in §§2.2.1.1 and 2.2.1.2 below.

§2.2.1.1 Internets

In recent decades, and in the past five to ten years in particular, computers have become interconnected by networks by an ever increasing extent; initially, via local area networks (or "LANs"), and more recently via LANs, wide area networks (or "WANs") and the Internet. In 1969, the Advanced Research Projects Agency (ARPA) of the U.S. Department of Defense (DoD) deployed Arpanet as a way to explore packet-switching technology and protocols that could be used for cooperative, distributed, computing. Early on, Arpanet was used by the TELNET application which permitted a single terminal to work with different types of computers, and by the file transfer protocol (or "FTP") which permitted different types of computers to transfer files from one another. In the early 1970s', electronic mail became the most popular application which used Arpanet.

This packet switching technology was so successful, the ARPA applied it to tactical radio communications (Packet Radio) and to satellite communications (SATNET). However, since these networks operated in very different communications environments, certain parameters, such as maximum packet size for example, were different in each case. Thus, methods and protocols were developed for "internetworking" these different packet switched networks. This work lead to the transmission control protocol (or "TCP") and the internet protocol (or "IP") which became the TCP/IP protocol suite. Although the TCP/IP protocol suite, which is the foundation of the Internet, is known to those skilled in the art, it is briefly described in §2.2.1.1.1 below for the reader's convenience.

§2.2.1.1.1 The TCP/IP Protocol Stack

The communications task for TCP/IP can be organized into five (5) relatively independent layers—namely, (i) an application layer, (ii) a host-to-host layer, (iii) an Internet layer, (iv) a network access layer, and (v) a physical layer. The physical layer defines the interface between a data transmission device (e.g., a computer) and a. transmission medium (e.g., twisted pair copper wires, optical fiber, etc.). It specifies the characteristics of the transmission medium and the nature of the signals, the data rate, etc. The network access layer defines the interface between an end system and the network to which it is attached. It concerns access to, and routing data across, a network. Frame Relay is an example of a network access layer. The internet layer (e.g., IP) defines interfaces between networks and provides routing information across multiple networks. The host-to-host layer (e.g., TCP) concerns assuring the reliability of the communication. Finally, the application layer provides an interface to support various types of end user applications (e.g., the simple mail transfer protocol (or "SMTP") for e-mail, the file transfer protocol (or "FTP"), etc.).

Basically, each of the layers encapsulates, or converts, data in a high level layer. For example, referring to FIG. 1, user data 100 as a byte stream is provided with a TCP header 102 to form a TCP segment 110. The TCP segment 110 is provided with an IP header 112 to form an IP datagram 120. The IP datagram 120 is provided with a network header 122 to define a network-level packet 130. The physical layer converts the network-level packet to radio, electrical, optical (or other) signals sent over the transmission medium at a specified rate with a specified type of modulation.

The TCP header 102, as illustrated in FIG. 2, includes at least twenty (20) octets (i.e., 160 bits). Fields 202 and 204 identify ports at the source and destination systems, respectively, that are using the connection. Values in the sequence number 206, acknowledgement number 208 and window 216 files are used to provide flow and error control. The value in the checksum field 218 is used to detect errors in the TCP segment 110.

FIGS. 3A and 3B illustrate two (2) alternative IP headers 112 and 112', respectively. Basically, FIG. 3A depicts the IP protocol (Version 4) which has been used. FIG. 3B depicts a next generation IP protocol (Version 6) which, among other things, provides for more source and destination addresses.

More specifically, referring to FIG. 3A, the four (4) bit version field 302 indicates the version number of the IP, in this case, version 4. The four (4) bit Internet header length field 304 identifies the length of the header 112 in 32-bit words. The eight (8) bit type of service field 306 indicates the service level that the IP datagram 120 should be given. The sixteen (16) bit total length field 308 identifies the total length of the IP datagram 120 in octets. The sixteen (16) bit identification field 310 is used to help reassemble fragmented user data carried in multiple packets. The three (3) bit flags field 312 is used to control fragmentation. The thirteen (13) bit fragment offset field 314 is used to reassemble a datagram 120 that has become fragmented. The eight (8) bit time to live field 316 defines a maximum time that the datagram is allowed to exist within the network it travels over. The eight (8) bit protocol field 318 defines the higher-level protocol to which the data portion of the datagram 120 belongs. The sixteen (16) bit header checksum field 320 permits the integrity of the IP header 112 to be checked. The 32 bit source address field 322 contains the IP address of the sender of the IP datagram 120 and the 32 bit destination address field 324 contains the IP address of the host to which the IP datagram 120 is being sent. Options and padding 326 may be used to describe special packet processing and/or to ensure that the header 112 takes up a complete set of 32 bit words.

Referring to FIG. 3B, the four (4) bit version field 302 indicates the version number of the IP, in this case, version 6. The four (4) bit priority field 328 enables a sender to prioritize packets sent by it. The 24 bit flow label field 330 is used by a source to label packets for which special handling is requested. The sixteen (16) bit payload length field 332 identifies the size of the data carried in the packet. The eight (8) bit next header field 334 is used to indicate whether another header is present and if so, to identify it. The eight (8) bit hop limit field 336 serves to discard the IP datagram 120 if a hop limit (i.e., the number of times the packet is routed) is exceeded. Also provided are 128 bit source and destination address fields 322' and 324', respectively.

Having described the TCP/IP protocol suite, the routing of a TCP/IP packet is now described in §2.2.1.1.2 below.

§2.2.1.1.2 Routing TCP/IP Packets

A TCP/IP packet is communicated over the Internet (or any internet or intranet) via routers. Basically, routers in the Internet use destination address information (Recall fields 324' and 324') to forward packets towards their destination. Routers interconnect different networks. More specifically, routers accept incoming packets from various connected networks, use a look-up table to determine a network upon which the packet should be placed, and routes the packet to the determined network. The router may buffer incoming packets if the networks are providing packets faster than it can route them. Similarly, the router may buffer outgoing packets if the router provides outgoing packets faster than the determined networks can accept them. The router may also arbitrate output port contention which is performed by the arbitration technique of the present invention. In some highspeed routers, packets are segmented into cells having a fixed data length before they are routed.

FIG. 4, which includes FIGS. 4A through 4C, illustrates the communication of data from a sender, to a receiver, using the TCP/IP protocol suite. Referring first to FIG. 4A, an application protocol 402 prepares a block of data (e.g., an e-mail message (SMTP) a file (FTP), user input (TELNET), etc.) 100 for transmission. Before the data 100 are sent, the sending and receiving applications agree on a format and encoding and agree to exchange data. If necessary the data are converted (character code, compression, encryption, etc.) to a form expected by the destination.

The TCP layer 404 may segment the data block 100, keeping track of the sequence of the blocks. Each TCP segment 110 includes a header 102 containing a sequence number (recall field 206) and a frame check sequence to detect errors. A copy of each TCP segment is made so that, if a segment is lost or damaged, it can be retransmitted. When an acknowledgement of safe receipt is received from the receiver, the copy of the segment is erased.

The IP layer 406 may break a TCP segment into a number of datagrams 120 to meet size requirements of networks over which the data will be communicated. Each datagram includes the IP header 112.

A network layer 408, such as frame relay for example, may apply a header and trailer 122 to frame the datagram 120. The header may include a connection identifier and the trailer may contain a frame check sequence for example. Each frame 130 is then transmitted, by the physical layer 410, over the transmission medium as a sequence of bits.

FIG. 4B illustrates the operation of TCP/IP at a router in the network. The physical layer 412 receives the incoming signal 130 from the transmission medium and interprets it as a frame of bits. The network (e.g., frame relay) layer 414 removes the header and trailer 122 and processes them. A frame check sequence may be used for error detection. A connection number may be used to identify the source. The network layer 414 then passes the IP datagram 120 to the IP layer 418.

The IP layer examines the IP header 112 and makes a routing decision (Recall the destination address 324, 324'.). A local line control (or "LLC") layer 420 uses a simple network management protocol (or "SNMP") and adds a header 450 which contains a sequence number and address information. Another network layer 422 (e.g., media access control (or "MAC")) adds a header and trailer 460. The header may contain address information and the trailer may contain a frame check sequence. The physical layer 424 then transmits the frame 150 over another transmission medium.

FIG. 4C illustrates the operation of TCP/IP at a receiver. The physical layer 432 receives the signal from the transmission medium and interprets it as a frame of bits. The network layer 434 removes the header and trailer 460 and processes them. For example, the frame check sequence in the trailer may be used for error detection. The resulting packet 140 is passed to the transport layer 436 which processes the header 450 for flow and error control. The resulting IP datagram 120 is passed to the IP layer 438 which removes the header 112. Frame check sequence and other control information may be processed at this point.

The TCP segment 110 is then passed to the TCP layer 440 which removes the header 102 and may check the frame check sequence (in the event of a match, the match is acknowledged and in the event of a mismatch, the packet is discarded). The TCP layer 440 then passes the data 100 to the application layer 442. If the user data was segmented (or fragmented), the TCP layer 440 reassembles it. Finally, the application layer 442 performs any necessary transformations, such as decompression and decryption for example, and directs the data to an appropriate area of the receiver, for use by the receiving application.

§2.2.1.2 High Speed Networks

As discussed in §2.2.1 above, there has been a trend from circuit switched networks towards packet switched networks. For example, packet switched communications presently appear to be the preferred mode of communication over a Broadband-Integrated Services Digital Network (or "B-ISDN") service. Packet switching includes normal packet switching (e.g., X25) and fast packet switching (e.g., Asynchronous Transfer Mode or "ATM"). Normal packet switching assumes certain errors at each data link are probable enough to require complex protocols so that such errors can be controlled at each link. Link errors were a valid assumption and concern at one time. However, today data links are very reliable such that the probability of errors being introduced by data links are no longer of any concern. Hence, fast packet switching is becoming more prominent. The ATM protocol is discussed in §2.2.1.2.1 below.

§2.2.1.2.1 The Asynchronous Transfer Mode (ATM) Protocol

Since data links are very reliable and the probability of errors being introduced by data links are no longer of any great concern, ATM fast packet switching does not correct errors or control flow within the network (i.e., on a link-by-link basis). Instead, ATM is only concerned with three types of errors; namely bit errors, packet loss, and packet insertion. Bit errors are detected and/or corrected using end-to-end protocols. Regarding packet loss and insertion errors, ATM only uses prophylactic actions when allocating resources during connection set-up. That is, ATM operates in a connection-oriented mode such that when a connection is requested, a line terminal first checks whether sufficient resources (i.e., whether sufficient bandwidth and buffer area) are available. When the transfer of information is complete, the resources are "released" (i.e., are made available) by the line terminal. In this way, ATM reduces the number of overhead bits required with each cell, thereby permitting ATM to operate at high data rates.

The ATM protocol transfers data in discrete sized chunks called "cells". The use of fixed sized cells simplifies the processing required at each network node (e.g., switch) thereby permitting ATM to operate at high data rates. The structure of ATM cells is described in more detail below.

Finally, the ATM protocol permits multiple logical (or "virtual") connections to be multiplexed over a single physical interface. As shown in FIG. 5, logical connections in ATM are referred to as virtual channel connections (or "VCCs") 510. A VCC 510 is the basic unit of switching in an ATM network. A VCC 510 is established between two end users, through the network. A variable-rate, full-duplex flow of ATM cells may be exchanged over the VCC 510. VCCs 510 may also be used for control signaling, network management and routing.

A virtual path connection (or "VPC") 520 is a bundle of VCCs 510 that have the same end points. Accordingly, all of the cells flowing over all VCCs 510 in a single VPC 520 may be switched along the same path through the ATM network. In this way, the VPC 520 helps contain network control costs by grouping connections sharing common paths through the network. That is, network management actions can be applied to a small number of virtual paths 520 rather than a large number of individual virtual channels 510.

Finally, FIG. 5 illustrates that multiple virtual paths 520 and virtual channels 510 (i.e., logical connections) may be multiplexed over a single physical transmission path 530.

FIG. 6 illustrates the basic architecture for an interface between a user and a network using the ATM protocol. The physical layer 610 specifies a transmission medium and a signal-encoding (e.g., data rate and modulation) scheme. Data rates specified at the physical layer 610 may be 155.52 Mbps or 622.08 Mbps, for example. The ATM layer 620 defines the transmission of data in fixed sized cells and also defines the use of logical connections, both introduced above. The ATM adaptation layer 630 supports information transfer protocols not based on ATM. It maps information between a high layer 640 and ATM cells.

Recall that the ATM layer 620 places data in fixed sized cells (also referred to as a packet). An ATM packet includes a header field (generally five (5) bytes) and a payload (or information) field (generally 48 bytes). The main function of the header is to identify a virtual connection to guarantee that the ATM packet is properly routed through the network. Switching and/or multiplexing is first performed on virtual paths and then on virtual channels. The relatively short length of the payload or information field reduces the size required for internal buffers at switching nodes thereby reducing delay and delay jitter.

More specifically, FIG. 7A illustrates an ATM cell 700 having a header 710 as formatted at a user-network interface, while FIG. 7B illustrates the ATM cell 700' having a header 710' as formatted internal to the network. Referring first to the header 710 as formatted at the user-network interface, a four (4) bit generic flow control field 712 may be used to assist an end user in controlling the flow of traffic for different qualities of service. The eight (8) bit virtual path identifier field 714 contains routing information for the network. Note that this field 714' is expanded to twelve (12) bits in header 710' as formatted in the network. In both headers 710 and 710', a sixteen (16) bit virtual channel identifier field 716 contains information for routing the cell to and from the end users. A three (3) bit payload type field 718 indicates the type of information in the 48 octet payload portion 750 of the packet. (The coding of this field is not particularly relevant for purposes of the present invention.) A one (1) bit cell loss priority field 720 contains information to let the network know what to do with the cell in the event of congestion. A value of 0 in this field 720 indicates that the cell is of relatively high priority and should not be discarded unless absolutely necessary. A value of 1 in this field indicates that the network may discard the cell. Finally, an eight (8) bit header error control field 722 contains information used for error detection and possibly error correction as well. The remaining 48 octets 750 define an information field.

Fast packet switching, such as ATM switching, has three main advantages. First ATM switching is flexible and is therefore safe for future transfer rates. Second, no resources are specialized and consequently, all resources may be optimally shared. Finally, ATM switches permit economies of scale for such a universal network.

§1.2.1.2.2 Switches

ATM cells are directed through a network by means of a series of ATM switches. An ATM switch must perform three basic functions for point-to-point switching; namely, (i) routing the ATM cell, (ii) updating the virtual channel identifier (VCI) and virtual path identifier (VPI) in the ATM cell header (Recall fields 714, 714' and 716'.), and (iii) resolving output port contention. The first two functions, namely routing and updating, are performed by a translation table belonging to the ATM switch. The translation table converts an incoming link (input port) and VCI/VPI to an outgoing-link (output port) and VCI/VPI. Resolving output port contention (which is performed by the arbitration technique of the present invention) is discussed in §2.2.3 below.

Thus, conceptually, an ATM switch may include input port controllers for accepting ATM cells from various physical (or logical) links (Recall FIG. 5.), a switching fabric for forwarding cells to another link towards their destination, and output port controllers for buffering ATM cells to be accepted by various physical (or logical) links. An exemplary, scalable, ATM switch is disclosed in U.S. Pat. Nos. 5,724,351 and 5,790,539 (each of which is incorporated herein by reference).

§2.2.2 The Need to Consider Different Types of Traffic—Priority

Different applications place different demands on communications networks. In particular, a certain application may require that its traffic be communicated (i) with minimum delay, (ii) at a fast rate, (iii) with maximum reliability, and/or (iv) to minimize communications (service) cost. For example, people would not tolerate much delay in their voice communications during a telephone call. High definition video requires a fast rate, or a high bandwidth, as well as low jitter, or delay variations. However, video communications may be able to tolerate some data corruption or loss to the extent that such losses are imperceptible or not annoying to people. The communications of important data, on the other hand, may tolerate delay, but might not tolerate data loss or corruption. Finally, an application may request that low priority data be communicated at a minimum cost. To the extent that the network traffic of an application does not have "special" requirements, it should be communicated with normal service.

Thus, many applications require a guaranteed quality of service (or "QoS") from a network provider. The network provider, in turn, may see guaranteeing QoS as a way to add value to their network and increase revenues. TCP/IP based internetworks and ATM based networks are envisioned as carrying many different types of data for many different applications which have different needs. (Recall the "Type of Service" field 306 of the internet protocol packet (version 4), the "priority" field 328 of the internet protocol packet (version 6), and "generic flow control" field 712 of the ATM cell.)

§2.2.3 Contention

A packet switch includes input and output ports interconnected by a switch fabric. The switch fabric can use shared-medium (e.g., bus), shared-memory, and space-division (e.g., crossbar) architecture. (See, e.g., the article, F. A. Tobagi, "Fast Packet Switch Architectures for Broadband Integrated Services Digital Networks", *Proceedings of the IEEE*, Vol. 78, No. 1, pp. 133–167 (January 1990).) The function of a packet switch is to transfer packets from the input ports to the appropriate output ports based on the addresses contained within the packet headers. In practice, the variable length packets are usually broken into fixed sized cells (not necessarily 53 bytes) before being transmitted across the switch fabric; the cells are reassembled at the output of the switch. (See, e.g., the article, T. Anderson, et al., "High Speed Switch Scheduling for Local Area Networks", *ACM Trans. Computer Systems*, pp. 319–352 (November 1993); hereafter referred to as "the Anderson article".) Since multiple packets from different input ports could be destined for the same output port at the same time (referred to as "output port contention" or simply "contention"), a switch arbitration or scheduling algorithm is needed to choose from among the contending packets, the one preferred at that time slot, provide a grant to the input port corresponding to the preferred packet, and configure the switch fabric to transfer the packet.

An arbiter is used to resolve output port contention among two or more packets or cells destined for the same output port. The arbiter chooses a packet or cell which "wins" contention (i.e., which is applied to the output port). Other packets or cells contending for the output port "lose" contention (i.e., they must wait before being applied to the output port).

Reducing the arbitration time can significantly reduce the packet delay across a switch, thus enabling high speed implementation.

§2.2.3.1 Buffering to Alleiviate Contention

To prevent the packets or cells losing contention for the output port from being lost, buffering is required. There are three basic buffering strategies; namely, pure input queuing, pure output queuing and central queuing.

§2.2.3.1.1 Input Port Buffering

Pure input queuing provides a dedicated buffer at each input port. Arbitration logic is used to decide which input port buffer will be next served. The arbitration logic may be simple (e.g., round robin in which the inlet buffers are served in order, or random in which the inlet buffers are served randomly) or complex (e.g., state dependent in which the most filled buffer is served next, or delay dependent in which the globally oldest cell is served next).

Unfortunately, with input queuing, a packet or cell in the front of the queue waiting for an occupied output channel to become available may block other packets or cells behind it which do not need to wait. This is known as head-of-line (or "HOL") blocking. A post office metaphor has been used to illustrate head-of-line (HOL) blocking in the book, M. dePrycker, *Asynchronous Transfer Mode: Solution of Broadband ISDN,* pp. 133–137 (Ellis Horwood Ltd., 1991). In the post office metaphor, people (representing cells) are waiting in a line (representing an input buffer) for either a stamp window (a first output port) or an airmail window (a second output port). Assume that someone (a cell) is already at the stamp window (the first output port) and that the first person in the line (the HOL of the input buffer) needs to go to the stamp window (the first output port). Assume further that no one is presently at the airmail window (the second output port) and that the second and third people in line (cells behind the HOL cell in the input queue) want to go to the airmail window (the second output port). Although the airmail window (second output port) is available, the second and third people (cells behind the HOL cell) must wait for the first person (the HOL cell) who is waiting for the stamp window (the first output port) to become free. Therefore, as the post office metaphor illustrates, the head-of-line (HOL) cell waiting for an output port to become free often blocks cells behind it which would otherwise not have to wait. Simulations have shown that such head-of-line (HOL) blocking decreases switch throughput.

A simple round robin scheme is generally adopted in an arbiter to ensure a fair arbitration among the inputs, such as iSLIP (See, e.g., the article, N. McKeown, et al., "Scheduling Cells in an Input-Queued Switch", *IEEE Electronics Letters,* Vol. 29, No. 25, pp. 2174–2175 (December 1993); hereafter referred to as "the McKeown article".) and DRRM (See, e.g., the article, H. J. Chao, et al., "Centralized Contention Resolution Schemes for a Large-Capacity Optical ATM Switch", *Proceedings IEEE ATM Workshop,* Fairfax, Va. (May 1998); hereafter referred to as "the Chao article".). Imagine there is a token circulating among the inputs in a certain ordering. The input that is granted by the arbiter is said to grasp the token, which represents the grant signal. The arbiter is responsible for moving the token among the inputs that have request signals. The traditional arbiters handle all inputs together and the arbitration time is proportional to the number of inputs. As a result, the switch size or capacity is limited given a fixed amount of arbitration time.

Basically, as shown in FIG. 8, a classical arbiter 800 accepts n request signals (R) and provides n grant signals (G).

Central queuing includes a queue not assigned to any inlet (input port) or outlet (output port). Each outlet will select cells destined for it in a first in, first out (FIFO) manner. However, the outlets must be able to know which cells are destined for them. Moreover, the read and write discipline of the central queue cannot be a simple FIFO because ATM cells destined for different outlets are all merged into a single queue. Turning again to the post office metaphor, a single line (central queue) of people (ATM cells) are waiting to visit the stamp window (a first output port) or the airmail window (a second output port). As a window opens up (i.e., as an output port becomes available), a server searches the line (central queue) for the next person (ATM cell) needing the available window (requiring the available output port). The server brings that person (ATM cell) to the open window (available output port) regardless of whether the person (the ATM cell) is at the front of the line (HOL). As the post office metaphor illustrates, the central queue requires complex memory management system given the random accessibility required. Of course, the memory management system becomes more complex and cumbersome when the number of output ports (i.e., the size of the switch) increases.

An input queued switch has no speedup (i.e., the incoming lines, switching fabric, and outgoing lines operate at the same rate) and thus is relatively simple to implement. However, as described above, it suffers the well-known problem of head-of-line (HOL) blocking (See, e.g., the article, M. Karol, et al., "Input Versus Output Queuing on a Space Division Switch", *IEEE Trans. Comm.,* Vol. 35, No. 12, pp. 1347–1356 (1987).), which could limit its maximum throughput to about 58% when it uses first-in-first-out (FIFO) at each input port and operates under uniform traffic (i.e., the output address of each packet is independently and equally distributed among every output). Many techniques have been suggested to reduce the HOL blocking, for example, by considering the first K cells in the FIFO, where K>1. (See, e.g., the article, M. Karol, et al., "Queuing in High-Performance Packet-Switching", *IEEE J. Select. Area in Comm.,* Vol. 6, pp. 1587–1597 (December 1988).) The HOL blocking can be eliminated entirely by using virtual output queuing (VOQ), where each input maintains a separate queue for each output. (See, e.g., the article, Y. Tamir, et al., "High Performance Multi-Queue Buffers for VLSI Communication Switches", *Proc. of 15$^{th}$ Ann. Symp. on Comp. Arch.,* pp. 343–354 (June 1988).)

To achieve 100% throughput in an input-queued switch with virtual output queues, sophisticated arbitration is required to schedule packets between various inputs and outputs. This may be accomplished through an application of bipartite graph matching (See, e.g., the Anderson article.)—each output must be paired with at most one input that has a cell destined for that output; a complex procedure to implement in hardware. It has been shown that an input buffered switch with virtual output queues can provide asymptotic 100% throughput using a maximum matching (a match that pairs the maximum number of inputs and outputs together; there is no other pairing that matches more inputs and outputs (See, e.g., the Anderson article.) algorithm. (See, e.g., the article, N. McKeown et al., "Achieving 100% Throughput in an Input-Queued Switch", *Proc. IEEE INFOCOM,* pp. 296–302 (1996).) However, the complexity of the best known maximum matching algorithm is exponential (i.e., $O(n^{2.5})$) (See, e.g., the technical publication, R. Tarjan, *Data Structures and Network Algorithms,* Bell Labs (1983).), which is too high for high speed implementation for relatively large n. In practice, a number of maximal matching (a match for which pairings cannot be trivially added; each node is either matched or has no edge to an unmatched node (See, e.g., the Anderson article.)) algorithms have been proposed, such as parallel iterative matching (PIM) (See, e.g., the Anderson article.), iterative round robin matching (iSLIP) (See, e.g., the McKeown article.), and dual round robin matching (DRRM) (See, e.g., the Chao article.). Unfortunately, their complexities are still much too high for high speed implementation for a relatively large n.

§2.2.3.1.2 Output Port Buffering

Pure output buffering solves the head-of-line (HOL) blocking problems of pure input buffering by providing only the output ports with buffers. Since the packets or cells buffered at an output port are output in sequence (i.e., first in, first out, or "FIFO"), no arbitration logic is required. In the post office metaphor, the stamp window (first output port) has its own line (first output buffer) and the airmail window (second output port) has its own line (second output buffer).

Although pure output buffering clearly avoids HOL blocking that may occur in pure input port buffering, it does have some disadvantages. Specifically, to avoid potential cell loss, assuming N input ports, the system must be able to write N ATM cells into any one of the queues (or output buffers) during one cell time (i.e., within 2.8 microseconds, where 2.8 microseconds is (53 bytes* 8 bits/byte)/155.52 Mbit/second. Such a high memory write rate is necessary because it is possible that each of the ATM cells arriving at each of the input ports will require the same output port. This requirement on the memory speed of the output buffer becomes a problem as the size of the switch (i.e., as N) increases. Accordingly, for a 1024-by-1024 switch (i.e., a switch having 1024 inputs and 1024 outputs), pure output buffering is not feasible because the speed of the output port buffers would have to be fast enough to handle 1024 cells during each time slot.

Speedup (c) of the switch fabric is defined as the ratio of the switch fabric bandwidth and the bandwidth of the input links. (Unless otherwise stated, it will be assumed that every input/output link has the same capacity.) An output queued switch is the one where the speedup is greater than or equal to the number of input ports ($c \geq n$). Since each output port can receive n incoming packets in a time slot, there is no output contention as discussed above. The switch has desirably zero input queuing delay without considering store-and-forward implementation. Unfortunately, an output queued switch is limited because the output port memory speed may limit it from buffering all possible input packets, particularly when the number of input ports is relatively large.

§2.2.3.1.3 Input and Output Port Buffering

An input-output queued switch will result by an input queued switch using a speedup of greater than one (c>1). A recent study shows that it is possible to achieve 100% switch throughput with a moderate speedup of c=2. (See, e.g., the technical publication, R. Guerin, et al., "Delay and Throughput Performance of Speed-Up Input-Queuing Packet Switches", *IBM Research Report RC* 20892, (June 1997).) Since each output port can receive up to c cells in a time slot (each input port can send up to c cells during the same time), the requirement on the number of input-output matching found in each arbitration cycle (c cycles in a time slot) may possibly be relaxed, enabling simpler arbitration schemes. On the other hand, the arbitration time is reduced c times, making the time constraint for arbitration more stringent. Thus, a fast arbitration technique is needed for output contention resolution in terabit packet switching.

§3. SUMMARY OF THE INVENTION

The present invention presents a hierarchical arbitration method in which requests are grouped, using a logical OR operation for example, and provided to higher levels of the hierarchy. Then, grant signals from higher levels of the hierarchy are either propagated down through each level of the hierarchy where they are used to modify, using a logical AND operation for example, grant signals. Alternatively, grant signals from all higher levels of the hierarchy may be provided to a leaf layer of the hierarchy where they are all used to modify, using a logical AND operation for example, grant signals.

Arbiters at each layer of the hierarchy may employ a toggling or ping-pong arbitration scheme such that if a favored request is granted in one arbitration cycle, a next request will be favored in the next arbitration cycle; otherwise the same request will be favored in the next arbitration cycle. Alternatively, arbiters at each layer of the hierarchy may operate such that if a favored request is granted in one arbitration cycle and if there was contention during that arbitration cycle, a new request will be favored in the next arbitration cycle; otherwise the same request will be favored in the next arbitration cycle.

The present invention also presents a way to arbitrate among multiple cells which may have different priorities. A hierarchical arbiter may be provided for each of the different priorities. The highest priority arbiter granting a cell is then chosen.

The present invention also presents switches which may use the hierarchical arbitration methods of the present invention. These switches may support multicasting.

§4. BRIEF DESCRIPTION OF THE DRAWINGS

FIG. 13A is a high level block diagram of a two-request arbiter which may be used to effect an arbitration technique of the present invention.

FIG. 13B is a truth table which may govern the operation of the two-request arbiter.

FIG. 13C is a diagram of logic components which may be used to build a two-request arbiter in accordance with the truth table of FIG. 13B.

FIG. 14 is a block diagram of a four-request arbiter constructed from the two-request arbiters.

FIG. 15 is a block diagram of a sixteen-request arbiter constructed from four-request arbiters.

§5. DETAILED DESCRIPTION

The present invention concerns novel methods and apparatus for arbitrating output port contention. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments and methods shown.

In the following, the basic concepts and basic functions performed by arbiters in accordance with the present invention are described in §5.1. Then, exemplary methodologies and embodiments of arbiters in accordance with the present invention are described in §5.2. Thereafter, ways in which arbiters of the present invention may handle priority are described in §5.3. Finally, exemplary methodologies and embodiments of switches, which use arbiters made in accordance with the present invention, are described in §5.4. Concluding remarks are presented in §5.5.

§5.1 Functions and Concepts of Arbiters made in Accordance with the Present Invention

§5.1.1 Arbitration

Input-output queued switches have been widely considered as the most feasible solution for large capacity packet switches and IP routers. The present invention provides a new arbitration scheme for output contention resolution in input-output queued switches. The present invention provides a high speed and cost-effective arbitration scheme which can maximize switch throughput and delay performance and which can support multimedia services with various quality-of-service (QoS) requirements.

Basically, the present invention divides the input requests into groups and applies arbitration recursively. A recursive arbiter of the present invention may be hierarchically structured, having multiple small-size arbiters at each layer. Request signals are propagated up through the hierarchy and grant signals are propagated down the hierarchy. The arbitration time of an n-input switch is proportional to $\log_4(n/2)$ when every two inputs, or every two input groups at each layer, are grouped.

The arbiter of the present invention can consider various priorities by arbitrating each priority level separately.

The arbiter of the present invention can support multicasting by managing multicast patterns ("MP") of bits corresponding, in each case, to output ports requested by a cell or packet.

§5.1.2 Output Port Arbiters: Request and Grant

Figure 1:
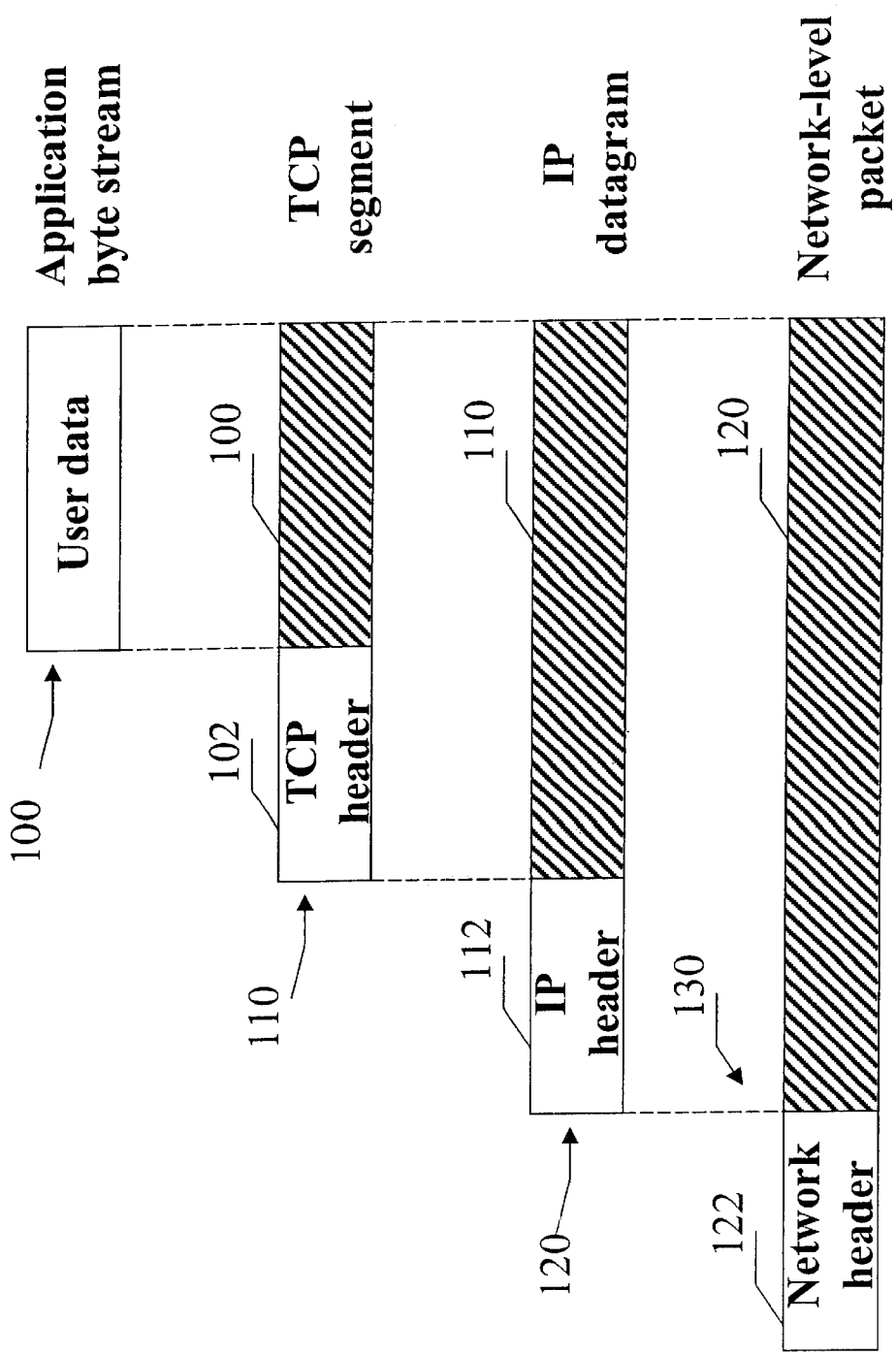
FIG. 1 illustrates the encapsulation of data in accordance with the TCP/IP protocol.
Figure 2:
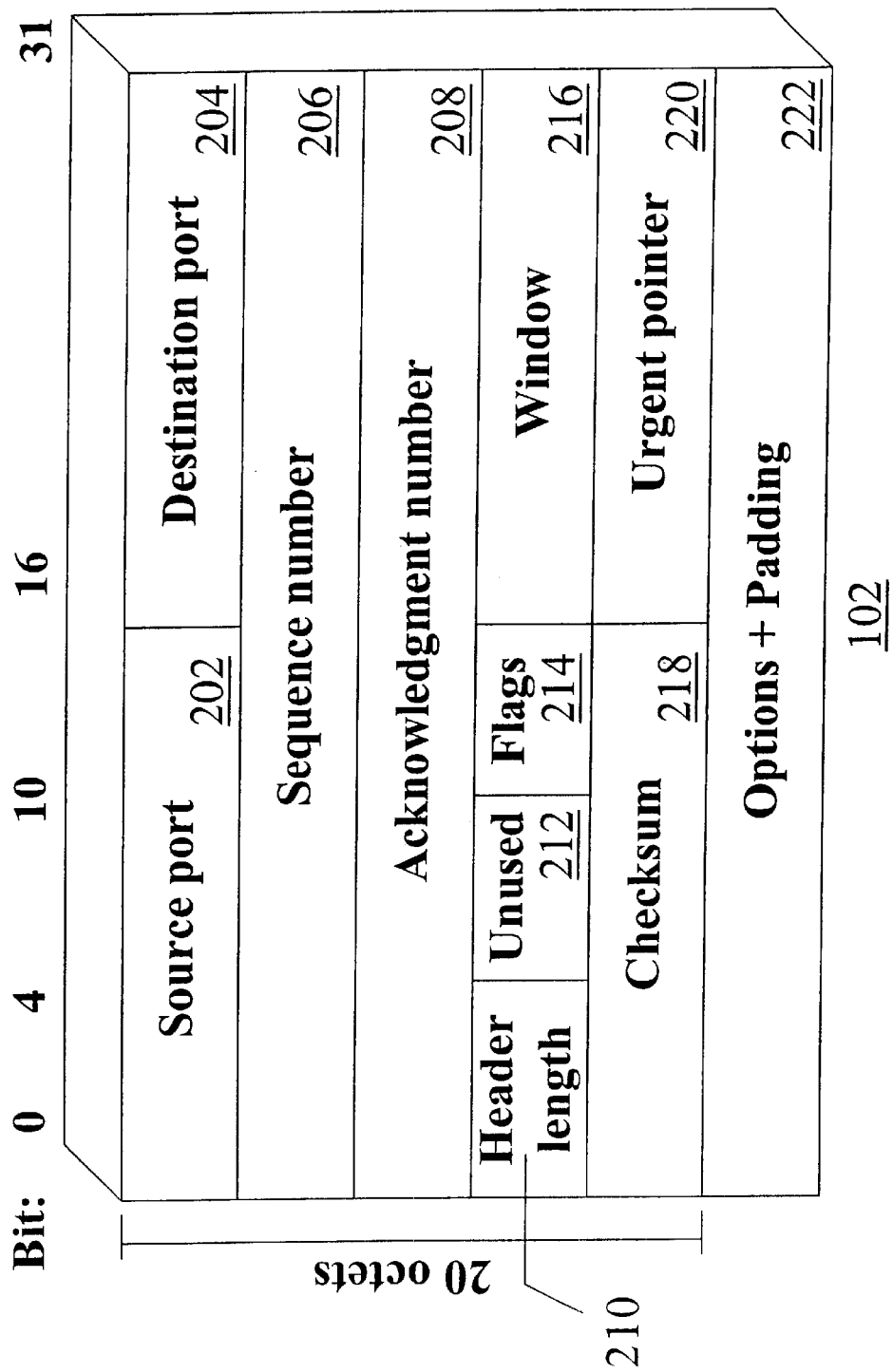
FIG. 2 is header data used in the TCP protocol.
Figure 3A:
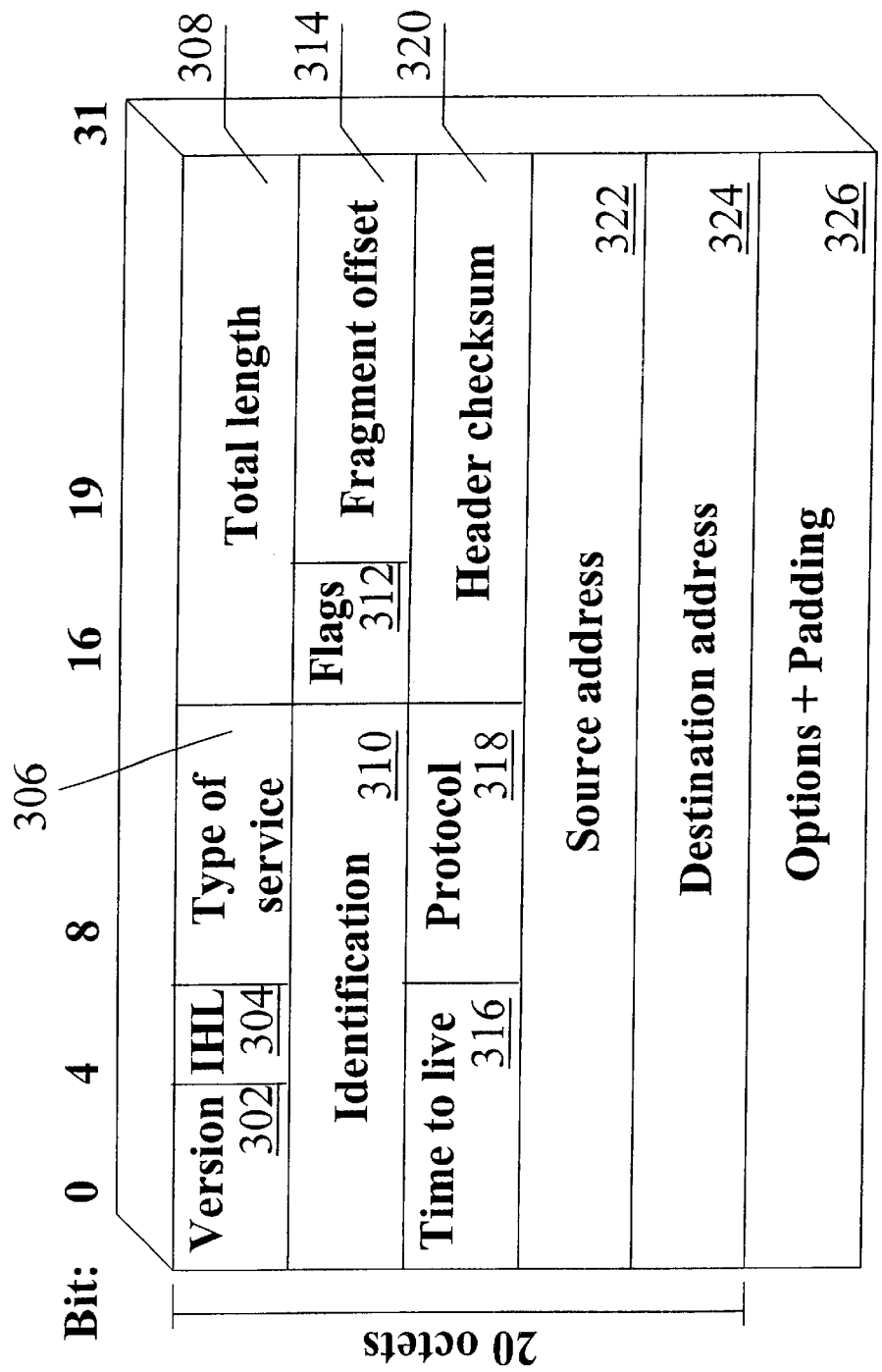
FIGS. 3A and 3B are header data used in versions 4 and 6, respectively, of the internet protocol.
Figure 3B:
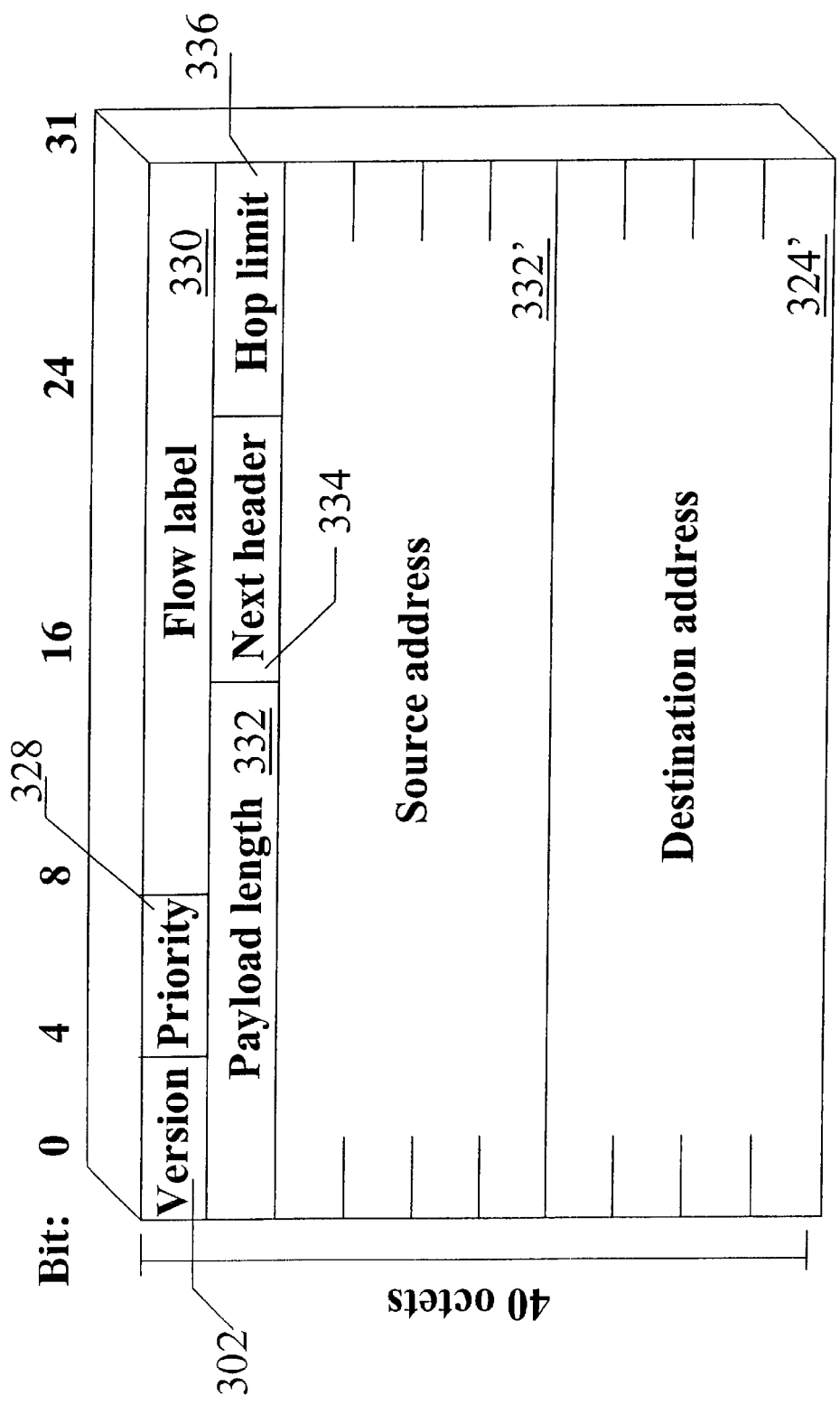
Figure 4A:
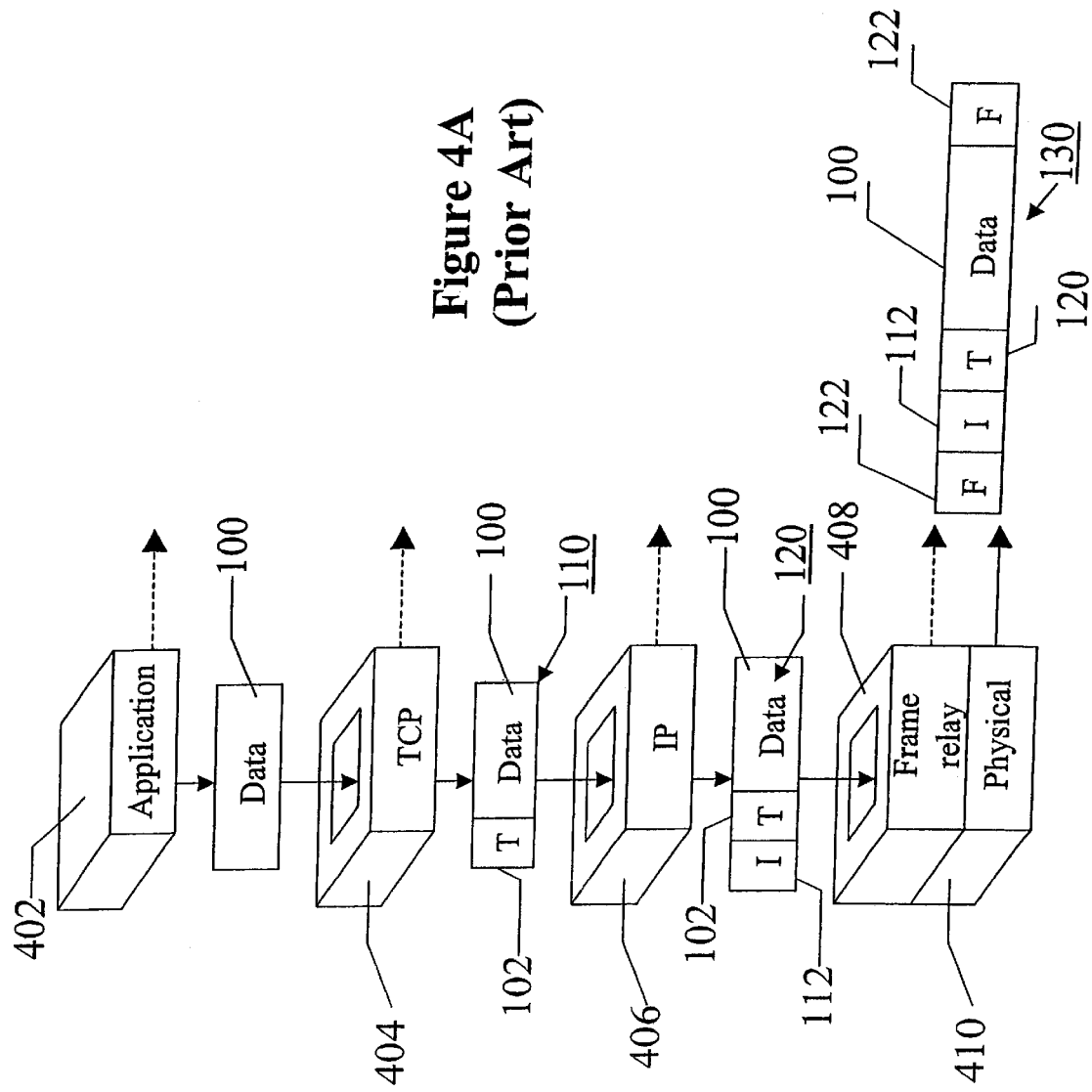
FIGS. 4A through 4C illustrate the processing of user data by various layers in the TCP/IP protocol stack, as the data is transmitted from a source application to a destination application, via a router.
Figure 4B:
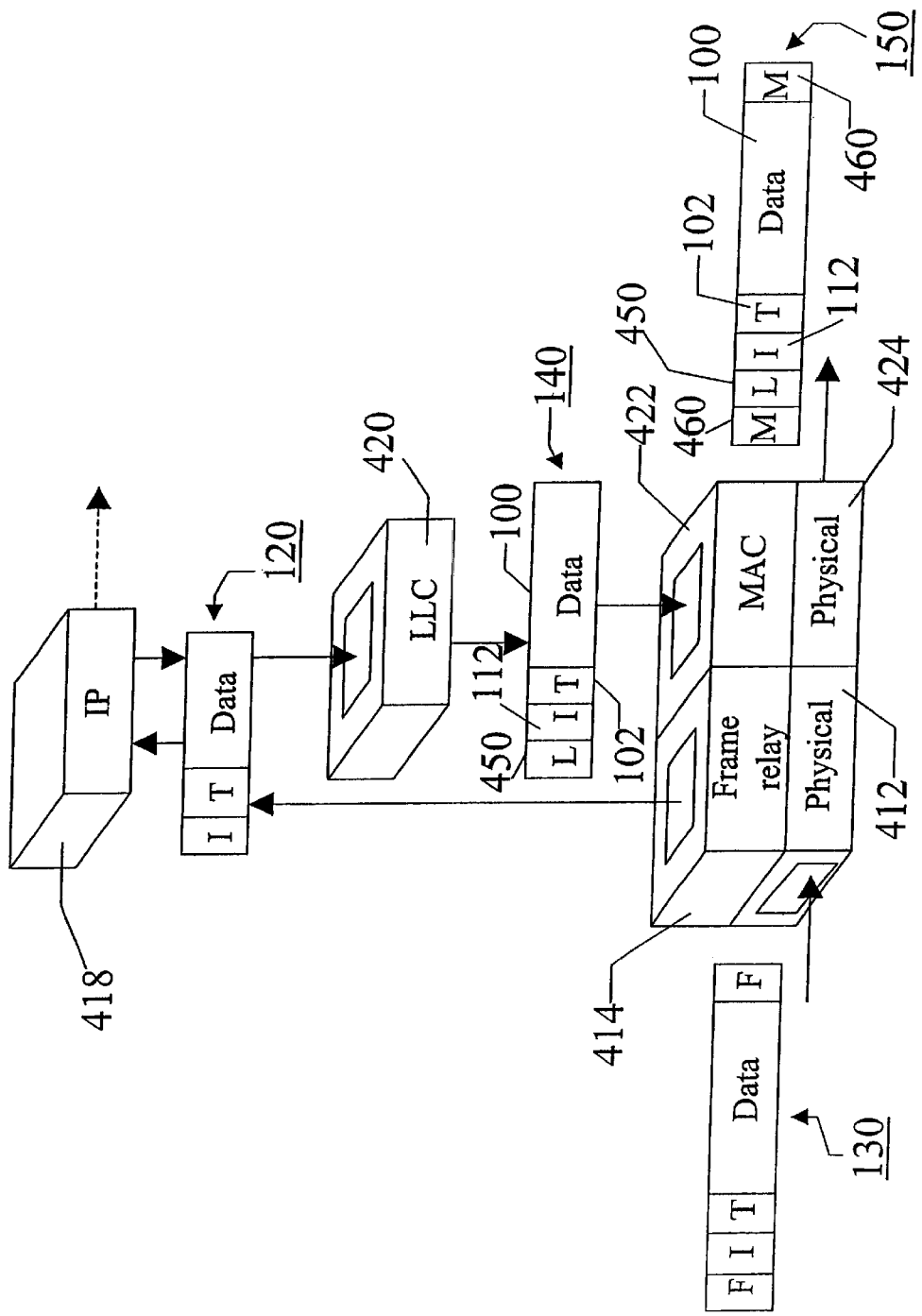
Figure 4C:
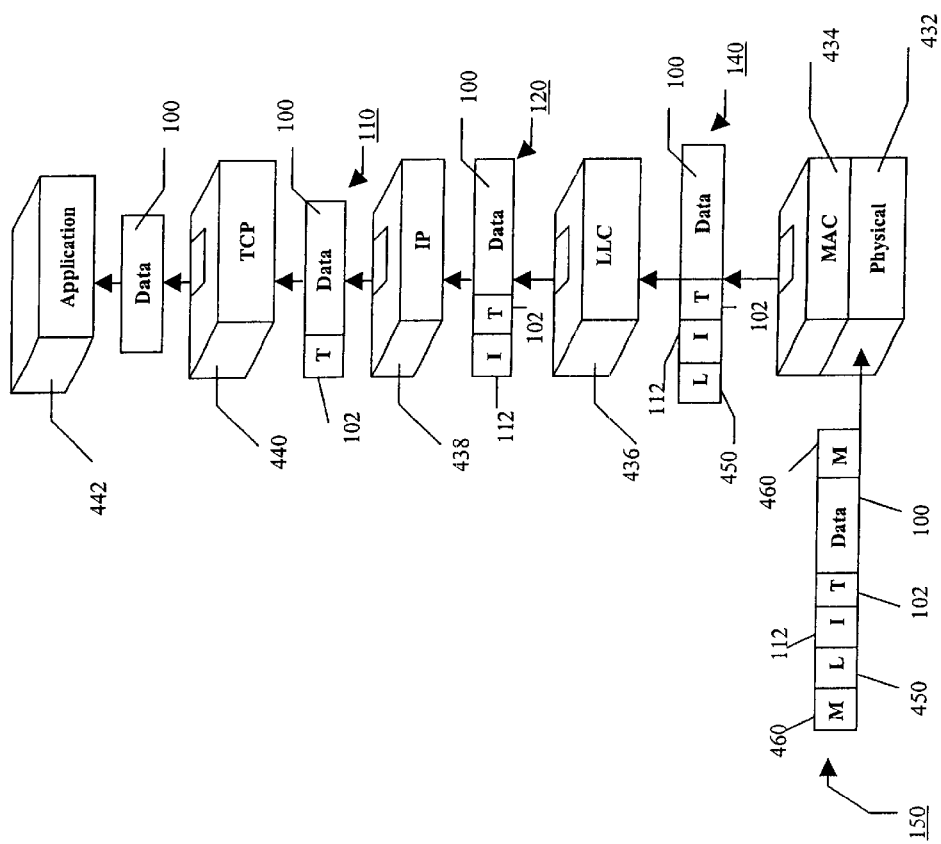
Figure 5:
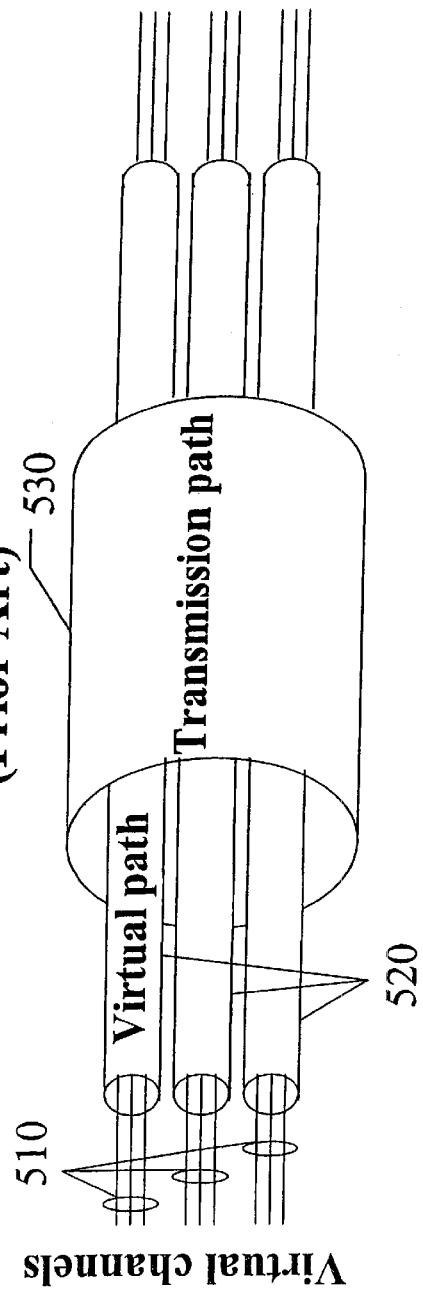
FIG. 5 illustrates the concept of virtual channels and virtual paths in ATM networks.
Figure 6:
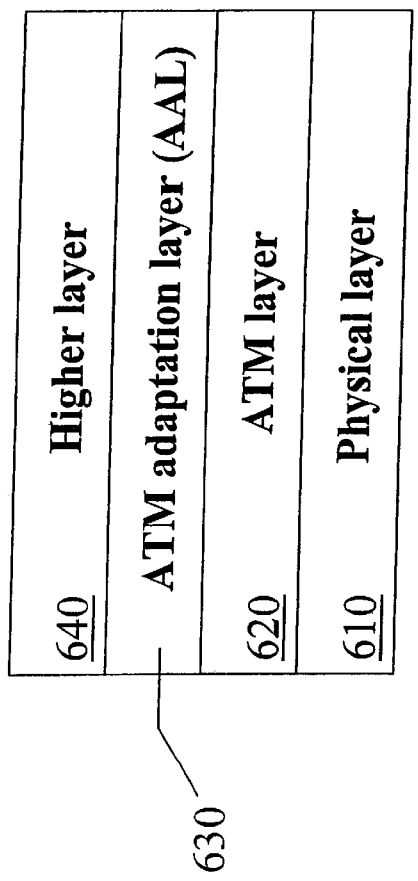
FIG. 6 illustrates the ATM protocol stack.
Figures 7A, 7B:
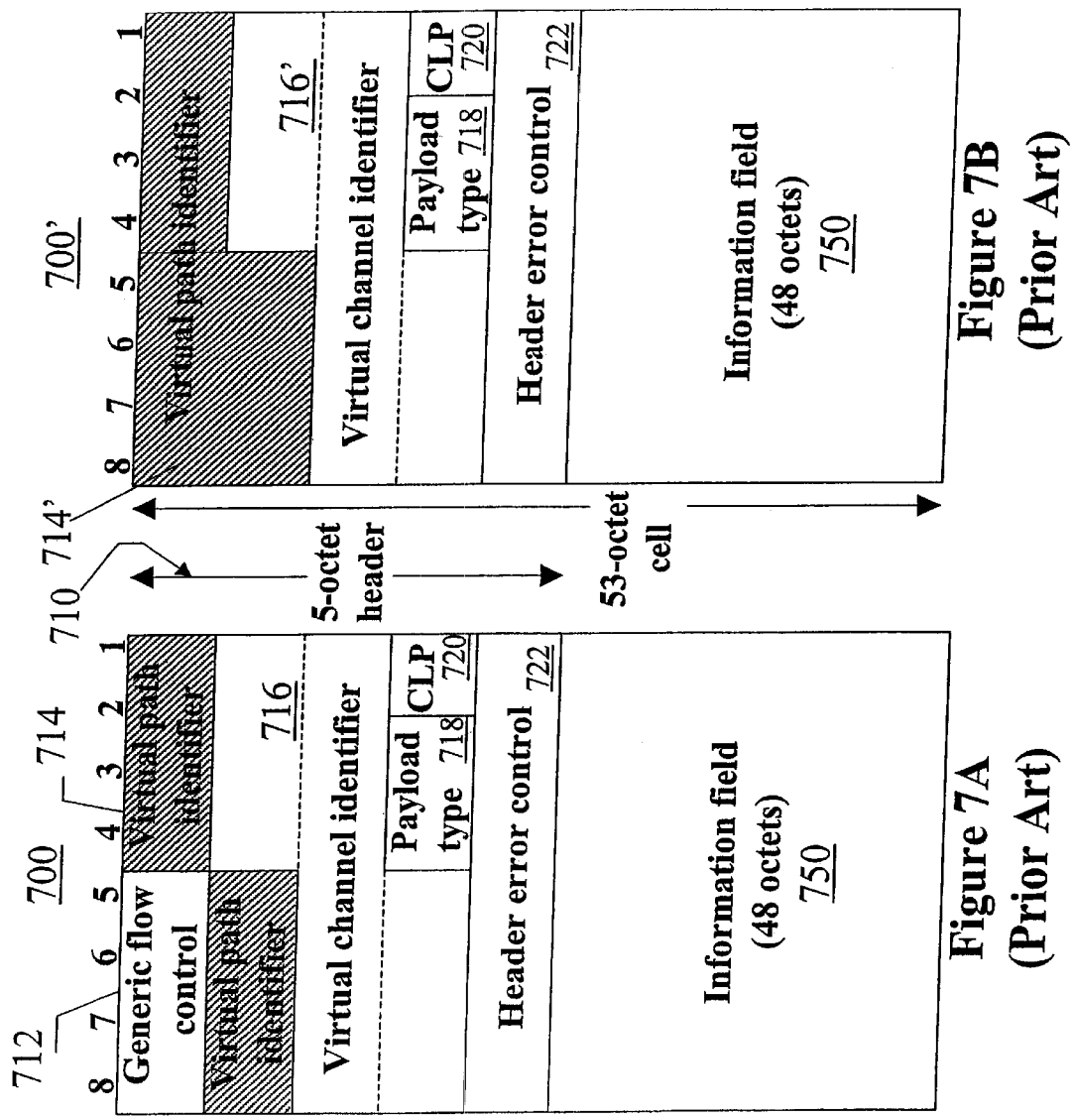
FIGS. 7A and 7B illustrate the structure of ATM cells at a user-network interface and within an ATM network, respectively.
Figure 9:
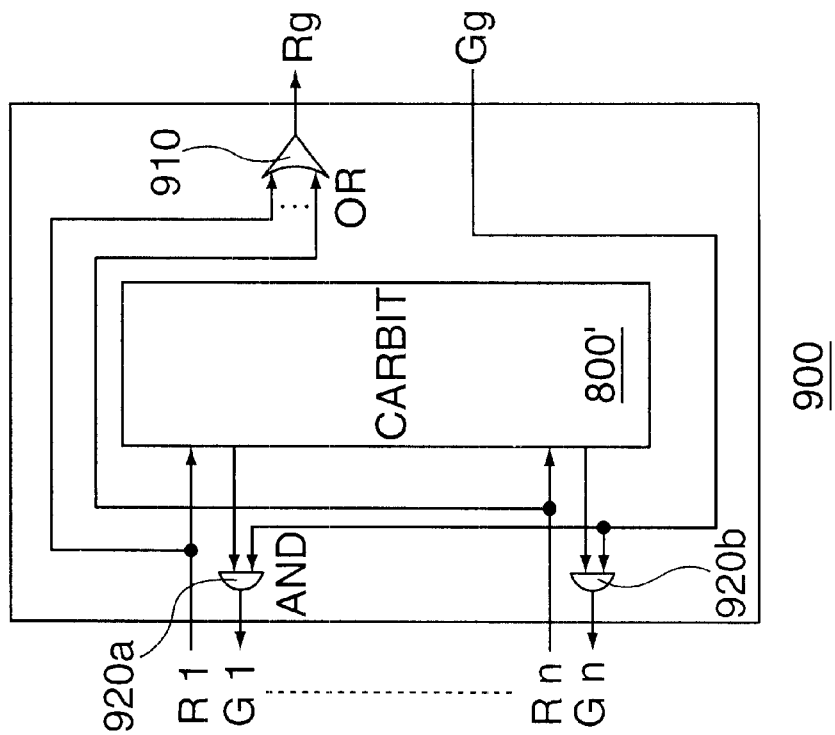
FIG. 9 is a high level block diagram of an arbiter, which may be used as a part of a hierarchical arbiter, for effecting an arbitration technique of the present invention.
Figure 8:
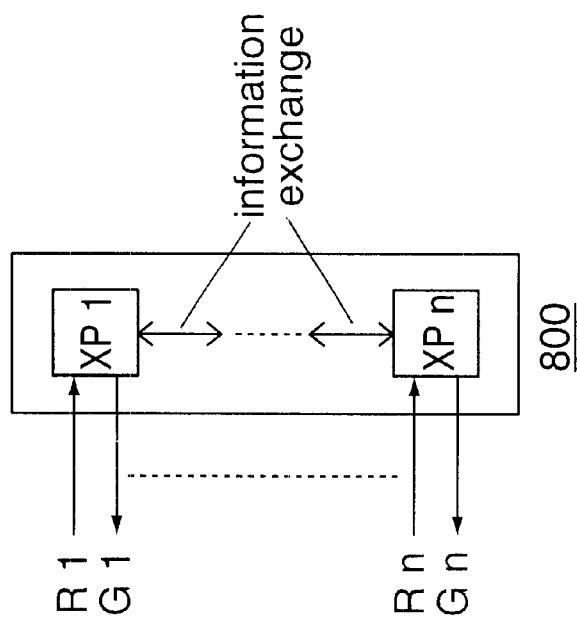
FIG. 8 is a high level block diagram of a classical arbiter.

Consider an n-input packet switch. To resolve its output contention, an arbiter may be used for each output to fairly select one among those incoming packets and send back a grant signal to the input corresponding to the selected packet. First, during every arbitration cycle, each input submits a one-bit request signal to each output (arbiter), thereby indicating whether its packet, if any, is destined for the output. Next, each output arbiter collects n request signals. One of these inputs with active request is granted according to some priority order. Finally, a grant signal is sent back to acknowledge the input. Recall from FIG. 8 above that a classical arbiter 800 accepts n request signals (R) and provides n grant signals (G). The present invention focuses on the second step which arbitrates one input among n possible ones. More specifically, as shown in FIG. 9, the present invention proposes a hierarchical arbiter 900 in which a group request signal Rg is generated from a number of incoming request signals R and in which grant signals G are generated from an incoming group grant signal Gg. The group request signal Rg is HIGH if any one of the incoming request signals R1 through Rn is HIGH, thereby indicating that there is at least one input request in the group. As shown in FIG. 9, the group request signal Rg may be generated by a logical OR gate 910. On the other hand, the group grant signal Gg is HIGH if and only if this group is granted in an upper layer of the hierarchy. If the group grant signal Gg is LOW, all local grant signals G1 through Gn are also LOW. As shown in FIG. 9, grant signals G1 through Gn may be generated by logically ANDing each grant signal of an arbitrator 800' with the group grant signal Gg.

§5.1.3 Tree Structure

Figure 10:
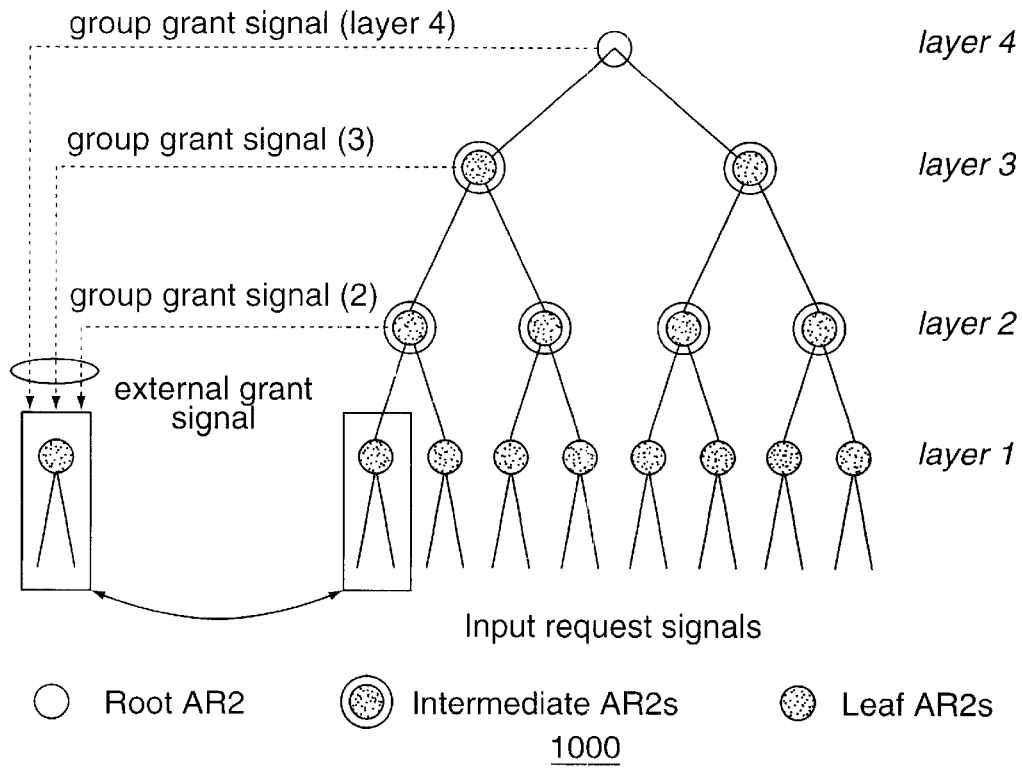
FIG. 10 illustrates arranging arbiters in a hierarchy and grouping request and grant signals, for effecting an arbitration technique of the present invention.

As alluded to above, in the arbitration technique of the present invention, the inputs are divided into groups. Each group has its own arbiter 900. The request information of each group is summarized as a group request signal Rg. Further grouping can be applied recursively to all of the group request signals at the current layer. Thus, as shown in FIG. 10, a tree structure 1000 is formed. As can be appreciated, an arbiter with n inputs can be constructed using multiple small-size arbiters (AR) at each layer. Different group sizes can be used. If it is assumed that the number of inputs $n=s^k$, a k-layer complete tree with a group size of s can be designed. If the group size s is two (2), for 16 inputs, there will be four (4) levels k as shown in FIG. 10.

As described in more detail in §5.2.1 below with reference to FIGS. 13A through 13C, an AR2 represents a 2-input AR. An AR2 may contain an internal feedback signal that indicates which input is favored. Once an input is granted in an arbitration cycle, the other input will be favored in the next cycle. In other words, the granted request is always chosen between left (input) and right alternately (also referred to as "ping-pong" arbitration or "PPA"). This mechanism may be maintained by producing an output flag signal fed back to the input. A register may be used to forward this signal at the beginning of each arbitration cycle. In an alternative arbitration technique, the favored input request only alternates in the event of contention.

As shown in FIG. 10, the first layer (layer 1) includes eight $(8)(=2^{(4-1)}=s^{(k-1)})$ arbiters (also referred to as "leaf" AR2s). The next two (2)(=4−2=k−2) layers (layers 2 and 3) include arbiters (also referred to as "intermediate" AR2s), $2^{k-i}$ of which are at layer i. Finally, the last layer (layer 4) includes a single arbiter (also referred to as a "root" AR2).

Each AR2 may accept two (2) request signals. An input request signal at layer i is the group request signal of $2^{i-1}$ inputs and can be produced by OR gates either directly or recursively. The grant signal from an AR2 has to be fed back to all the lower-layer AR2s related to the corresponding input. Therefore, in addition to the feedback flag signal, an AR2 adds an external grant signal that logically ANDs all grant signals at upper layers, thereby indicating the arbitration results of upper layers. As described below, the external grant signal may be used to govern a local flag signal update. If the external grant signal is invalid, which indicates that these two input requests as a whole are not granted at some upper layer(s), then the flag may be kept unchanged in order to preserve the original preference.

The root AR2 does not need an external grant signal. At each intermediate AR2, the local grant signals may be sent out without any interference from its external grant signal so that one gate delay is saved. In this case, the external grant signal is used only for governing the flag signal update. At each leaf AR2, the local grant signals combine the upper-layer arbitration results (i.e., its external grant signal) and indicate whether the corresponding input is granted or not. The external grant signal is added at the final stage to allow other local logical operations to be finished while waiting for the grant signals from upper layers. This minimizes the total arbitration time. In an alternative embodiment, at each intermediate AR2, the grant signals may be modified by logically ANDing them with the received group grant signal. In this case, at each leaf AR2 the local grant signals may be modified by logically ANDing them with only the received group grant signal.

Suppose n inputs are served in the increasing order of their input numbers, i.e., 1→2→ . . . →n→1 under a round-robin scheme. Each AR2 by itself performs round-robin service for its two (2) inputs. The arbitration technique of the present invention, as performed by a tree of AR2s shown in FIG. 10, can serve the inputs in the order of 1→3→2→4→1 when n=4 for instance, which is still round-robin, if each input always has packet to send and there is no conflict between all the input request signals.

Figure 11:
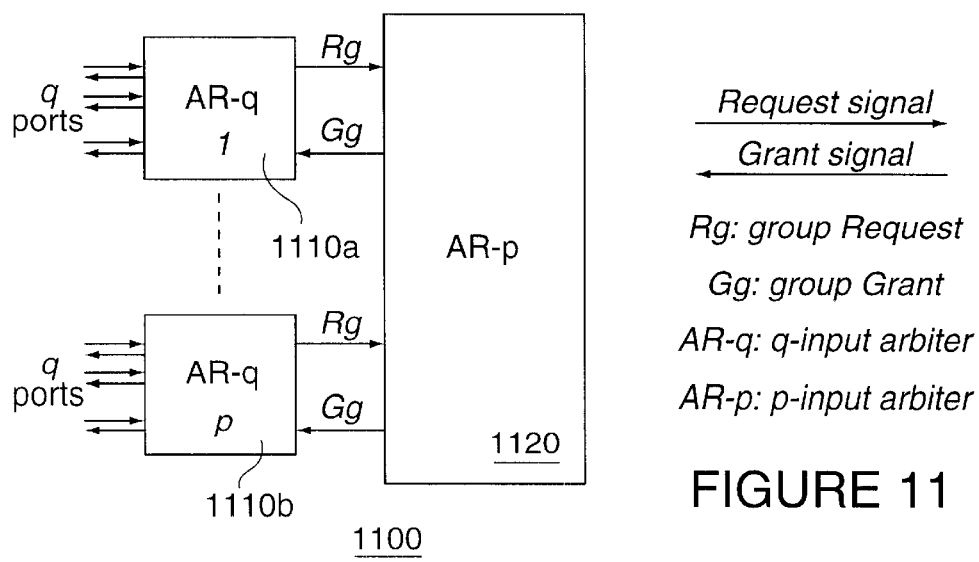
FIG. 11 is a high level block diagram of two hierarchical levels of arbiters.

As shown in FIG. 11, multiple hierarchical arbitrators 900 can be grouped together to form a large and multilayer arbiter 1100. More specifically, an n (=p*q) input arbiter is constructed from p, q-input hierarchical arbiters 1110 which group request Rg and group grant Gg signals are provided to and accepted from, respectively, a p-input arbiter 1120. Each of the arbiters 1110 and 1120 can be directedly constructed using a classical arbiter, or constructed using smaller hierarchical arbiters. Using such a direct construction can reduce the arbitration time from $T_n$ to max $\{T_q, O_q + T_p\} + a_2$, where $T_q$ is the arbitration time of a q-input arbiter, $O_q$ is the delay of a q-input OR gate, $T_p$ is the arbitration time of a p-input arbiter, and $a_2$ is the delay of a two-input AND gate. When $p=q=\sqrt{n}$, the arbitration time is reduced to $T_{\sqrt{n}} + O_{\sqrt{n}} + a_2$. In an extreme case, two-input arbiters can be used to recursively construct an n-input arbiter. The number of layers is $\log_2 n$ and the total arbitration time is reduced to: $T_2 + \lceil \log_2 n \rceil \cdot (O_2 + a_2)$, where $\lceil x \rceil$ denotes the largest integer less than x.

Although, in theory, any number of requests can be grouped together to generate a group request, given present device limitations of OR gates in which delays increase significantly with more than four (4) inputs, a preferred group size at this time is four (4). Naturally, larger group sizes may be used.

§5.1.4 Basic Method

Figure 12A:
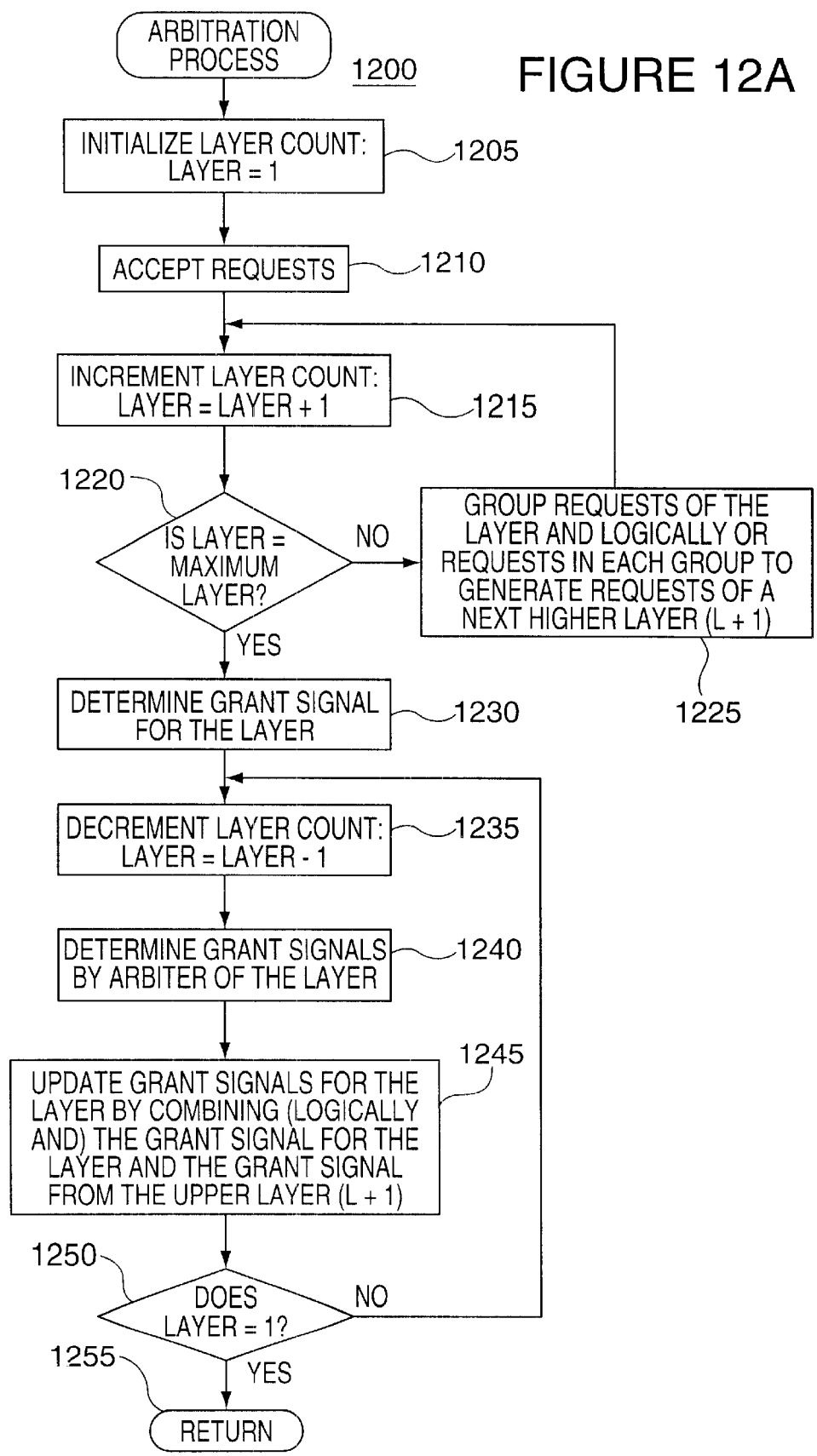
FIGS. 12A and 12B are flow diagrams of exemplary methods for effecting an arbitration process of the present invention.

FIG. 12A is a high level flow diagram of a method 1200 for effecting an arbitration technique of the present invention. Basically, (i) requests are accepted at the lowest level of the hierarchy and are generated for the higher levels of the hierarchy (See steps 1205, 1210, 1215, 1220, and 1225) and (ii) grant signals are determined and propagate down the hierarchy (See steps 1230, 1235, 1240, 1245, and 1250). More specifically, as shown in step 1205, a layer count is initialized to index the lowest layer of the hierarchy (layer=1). Next, as shown in step 1210, the requests at the current layer are accepted. As shown in step 1215, the layer count is incremented (layer=layer+1). As shown in decision step 1220, if the layer is not the maximum layer, processing branches to step 1225. At step 1225, the requests of the current layer are grouped, and the requests in each group are logically ORed to generate requests of the next layer (layer+1). Processing then branches back to step 1215 discussed above.

Returning to decision step 1220, if the layer is the maximum layer, this means that the requests have propagated, as group request signals, to the top of the hierarchy. In this case, processing branches to step 1230 where the grant signal for the (highest) layer is determined. Next, as shown in step 1235 the layer count is decremented (layer=layer−1). Then, as shown in step 1240, the grant signal is determined by an arbiter of the current layer. Next, as shown in step 1245, the grant signal is updated by combining (logically ANDing) the grant signal from the layer with the grant signal from the upper layer (layer+1). Next, at decision step 1250, it is determined whether or not the layer is the lowest layer of the hierarchy (layer=1). If not, processing branches to step 1235 discussed above. If so, the process 1200 is left via the return node 1255.

Figure 12B:
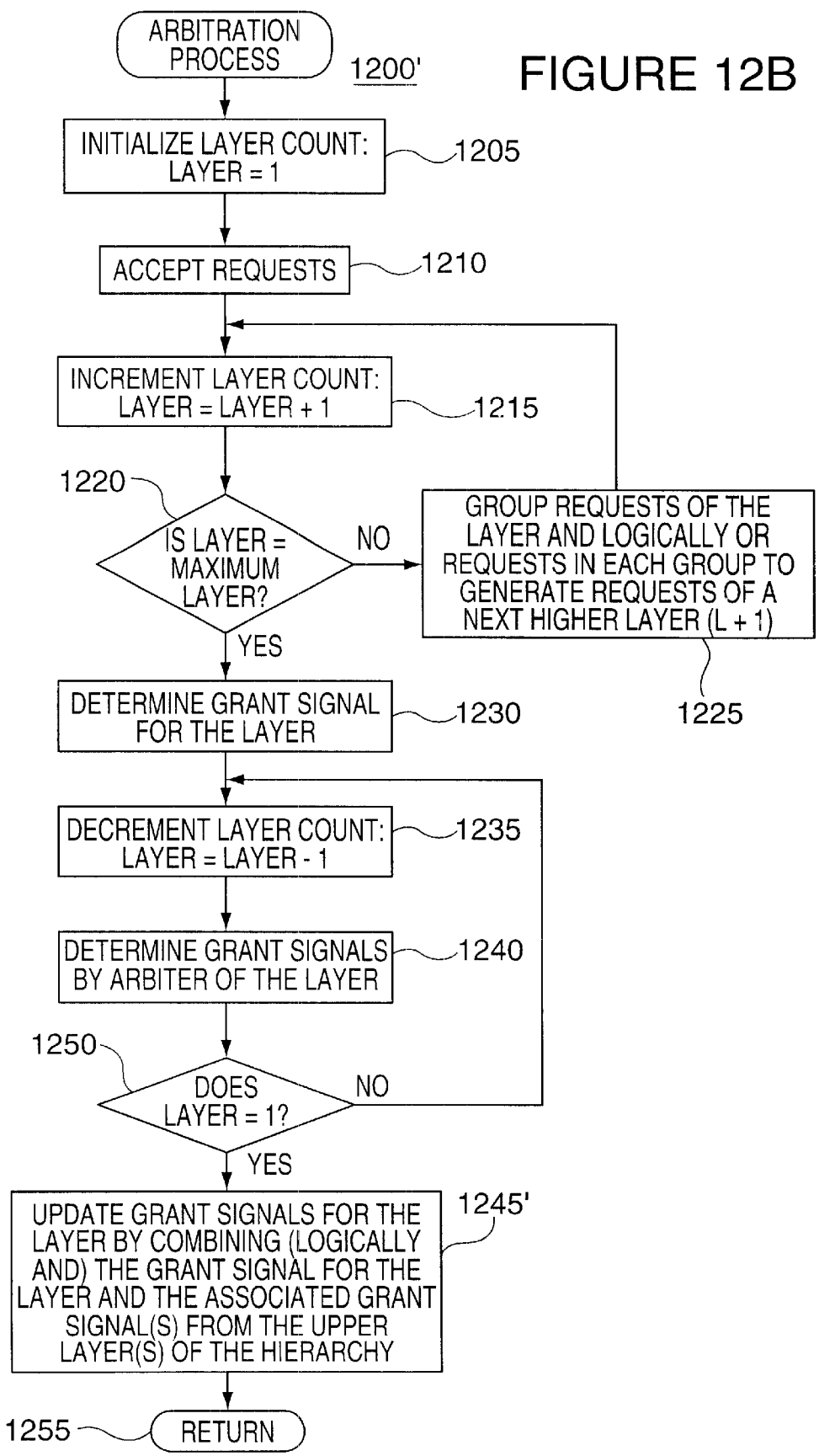

As mentioned above, for intermediate layers of the hierarchy, the grant signals need not be updated by the grant signal from the upper layer. Instead, only at the leaf arbiters of the lowest layer of the hierarchy, is the grant signal updated by all of the grant signals of the associated upper layers of the hierarchy. Basically, as shown in FIG. 12B, this method 1200' is similar to that of FIG. 12A except that step 1245 is not performed at each of the intermediate layers. Instead, as shown in step 1245' at the lowest (leaf) layer, the grant signals are updated by logically ANDing them with the group grant signal and all of the associated group grant signals of the upper layers of the hierarchy.

§5.1.5 Scaling Up

As can be appreciated from FIG. 11, the arbitration technique of the present invention is scalable so that a large number of input requests can be serviced.

§5.1.6 Handling Priority

As introduced in §2.2.2 above some "flows" or "sessions" of packets will have higher priority than others. Recall that sessions (and their associated packets) with various QoS requirements can be assigned different levels of service priority. The arbitration technique of the present invention may account for priority as follows.

Two (2) priority representations may be used in the arbitration technique of the present invention. The first representation emphasizes transferring efficiency, while the second representation emphasizes arbitration convenience. Suppose p levels of priority are supported. Thus, an input has one of a possible p+1 priority states, including the case of no request. These priority states can be represented by using $\log_2(p+1)$ bits. The inter-layer request information could be transferred either in serial using one line, or in parallel using multiple lines, depending on the tradeoff chosen between delay and pin count complexity. The serial/parallel format transformation can be realized by using shift registers.

Specific architectures for handling priority are described in §5.3 below.

§5.1.7 Handling Multicasting

Multicasting functionality permits a single cell to be sent to a number of locations. A switch (or router) using the arbitration technique of the present invention may support multicasting by providing a multicast pattern in which each bit of the multicast pattern corresponds to an output port. Basically, the multicast pattern may be derived based on VPI/VCI of a cell, using a lookup table of a switch, or destination address information of a packet, using a lookup table of a router.

§5.2 Methodology and Structures of Arbiters Made in Accordance with the Present Invention As described above with reference to FIG. 11, multiple small arbiters can be recursively grouped together to form a large and multi-layer arbiter. Recall that FIG. 11 depicts an n-input arbiter which includes p q-input arbiters (AR-q), from which the group request/grant signals are incorporated into a p-input arbiter (AR-p). The construction of a 256-input arbiter based on the basic units: 2-input arbiters is described in §§5.2.1 through 5.2.3 below.

§5.2.1 Logical Gate Level Structure AR2

FIGS. 13A and 13C show a basic two (2) input arbiter (also referred to as an "AR2") 1300 and its logical circuits, respectively. The two input arbiter 1300 contains an internally fed back flag signal, denoted by Fi, that indicates which input request is favored. (When the flag Fi is LOW, the input request $R_0$ is favored; when the flag Fi is HIGH, the input request $R_1$ is favored.) When all Gg inputs are 1, this indicates that these two input requests ($R_0$ and $R_1$), as a group, are granted by all the upper hierarchical layer(s). Once an input is granted in an arbitration cycle, the other input will be favored in the next cycle, as shown by the true table in FIG. 13B. This mechanism is maintained by producing an output flag signal, denoted by Fo, fed back to the input. Between Fo and Fi there is a D-flip-flop 1310 which is functioned as a register forwarding Fo to Fi at the beginning of each cell time slot. When at least one of Gg inputs is 0, this indicates that the group request of $R_0$ and $R_1$ was not granted at some upper hierarchical layer(s). Thus, neither request is granted ($G_0=G_1=0$). The flag is kept unchanged (Fo=Fi) in order to preserve the original preference. More specifically, recall from FIG. 9 that the local grant signals are logically ANDed with the grant signals from the upper hierarchical layer(s) to provide full information whether the corresponding input request is granted or not. Recall from FIG. 12A that the grant signals in each arbiter may be modified by logically ANDing them with the received group grant signal from the next higher level. In this case, only one Gg signal would need to be applied. However, recall from FIG. 12B that the grant signals need not be modified at intermediate arbiters. Instead, at the leaf arbiters, Gg inputs are added to allow other local logical operations to be finished in order to minimize the total arbitration time.

FIG. 13C is an exemplary logic circuit 1320', operating in accordance with the truth table 13B, which may be used in the two-input arbiter 1300 of FIG. 13A.

The first grant signal G0 is generated as follows. The first request signal R0 and an inverted second request signal R1 (inv) are applied to a first AND gate 1321. The first request signal and an inverted internal flag signal Fi (inv) are applied to a second AND gate. The outputs of the first and second AND gates 1321, 1322 are applied to a first OR gate 1323. The output of the first OR gate 1323, which can be thought of as a grant signal of the two-input arbiter, is provided, along with group grant signal(s) Gg of upper hierarchical layer(s), to a third AND gate 1324 which generates a first grant signal G0.

The second grant signal G1 is generated as follows. An inverted first request signal R0 (inv) and the second request signal R1 are provided to a fourth AND gate 1325. The second request signal R1 and the feedback flag signal Fi are provided to a fifth AND gate 1326. The outputs of the fourth and fifth AND gates 1325, 1326 are applied to a second OR gate 1327. The output of the second OR gate 1327, which can be thought of as a grant signal of the two-input arbiter, is provided, along with group grant signal(s) Gg of upper hierarchical layer(s), to a sixth AND gate 1328 which generates the second grant signal G1.

Thus, as can be appreciated from the foregoing discussion regarding the generation of grant signals, the arbiter 1320' corresponds to a leaf arbiter of a hierarchical arbiter operating in accordance with FIG. 12B.

Finally, the output flag Fo, which will serve as the fed back internal flag Fi in the next cycle, is generated as follows. The first request signal Ro and an inverted internal flag Fo (inv) are provided to a seventh AND gate 1330. The internal flag Fo and an inverted second request signal R1 are provided to an eighth AND gate 1331. The outputs of the seventh and eighth AND gates 1330, 1331 are provided to a third OR gate 1332. Each of the group grant signal(s) Gg of the high hierarchical layers are provided to a ninth AND gate 1329. The outputs of the third OR gate 1332 and the ninth AND gate 1329 are provided to a tenth AND gate 1333. An inverted output of the ninth AND gate 1329 and the internal flag signal Fi are provided to an eleventh AND gate 1334. The outputs of the tenth and eleventh AND gates 1333, 1334 are provided to a fourth OR gate 1335, which provides a feedback flag Fo. Thus, each time a request is granted, the grant signal will toggle for the next request, thereby ensuring that input requests are treated "fairly".

In an alternative technique, the internal feedback flag Fo is only toggled only if there was a contention (i.e., two requests) and a request was granted. This alternative technique is also "fair" since one input port is not "favored" at the expense of other input ports.

§5.2.2 AR4 from AR2s

A four (4) input arbiter module (also referred to as "AR4") has four request signals R0–R3, four output grant signals G0–G3, one outgoing group request R03 and one incoming group grant G03 signal. FIG. 14 depicts the construction of four-input arbiter 1400 using three (3) AR2s (two leaf AR2s and one intermediate AR2; all have the same or similar circuitry) 1300, two (2), two (2) input OR gates 1410, 1412 and one (1) four (4) input OR gate 1420. Each leaf AR2 1300a, 1300c handles a pair of inputs and generates the local grant signals while allowing two external grant signals coming from upper layers: one from the intermediate AR2 (G01 or G23) inside the AR4 and the other from outside AR4 (G03). These two signals directly join the logical AND gates at the final stage inside each leaf AR2 (Recall gates 1324 and 1328 of FIG. 13c.) for minimizing the arbitration delay. The group request signal and the group grant signal between input i and input j are denoted as Rij and Gij, respectively.

The intermediate AR2 1300b handles the group requests (R01 and R23) and generates the grant signals (G01 and G23) to each leaf AR2 respectively. It contains only one grant signal from the upper layer for controlling the flag signal.

§5.2.3 AR16 and AR256 FROM AR4s

As shown in FIG. 15, a sixteen-input arbiter (also referred to as an "AR16") 1500 can be built from five (5) four-input arbiters 1400. More specifically, an AR16 contains five (5) AR4s 1400 in two layers: four (4) AR4s 1400a–1400d at the lower layer handle the local input request signals R0–Rf and one (1) AR4 1400e at the higher layer handles the group request signals R03, R47, R8b, and Rcf.

Figure 16:
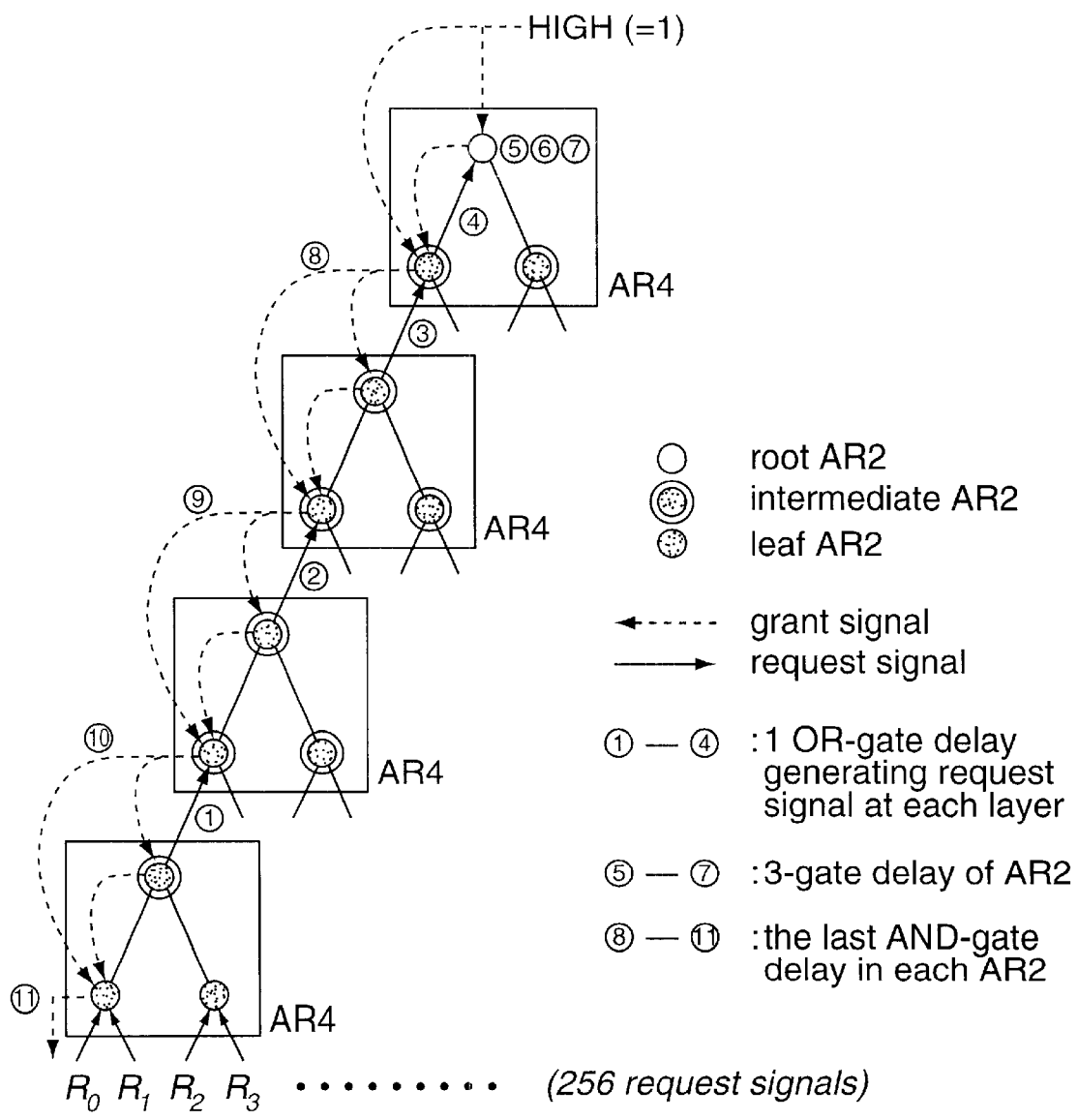
FIG. 16 illustrates the construction of a 256-request arbiter from four-request arbiters.

FIG. 16 illustrates a 256-input arbiter (also referred to as "AR256") 1600 built from four-input arbiters 1400. FIG. 16 also illustrates arbitration delay components. More specifically, the path numbered from 1 to 11 shows the components of the arbitration delay from the time an input sends its request signal to the time when it receives its grant signal. The first four gate delays (1–4) correspond to the time for the input's request signal to pass though the four layers of AR4s and reach the root AR2 within the topmost AR4, where one OR-gate delay is needed at each layer to generate the group request signal (Recall, e.g., OR gate 1420 of FIG. 14). The next three (3) gate delays (5–7) correspond to the time that the root AR2 within the topmost AR4 performs its arbitration (Recall e.g., AND gates 1321, 1322, 1325 and 1326, OR gates 1323 and 1327, and AND gates 1324 and 1328 of FIG. 13C). The last four (4) gate delays (8–11) correspond to the time for the grant signals at upper layers to pass down to the corresponding input. Thus, the total arbitration time of an AR256 is 11 gate delays. It thus follows that the arbitration time ($T_n$) of an n-input arbiter using such implementation is:

$$T_n = 2 \cdot \lfloor \log_4(n/2) \rfloor + 3. \quad (1)$$

where $\lfloor x \rfloor$ denotes the smallest integer exceeding x.

§5.3 Handling Priority

A group of p lines is used in the second representation (which emphasizes arbitration convenience). At most, one of the p lines is HIGH indicating that there is one request at the corresponding level of priority. There will be no request if all lines are LOW.

Figure 21:
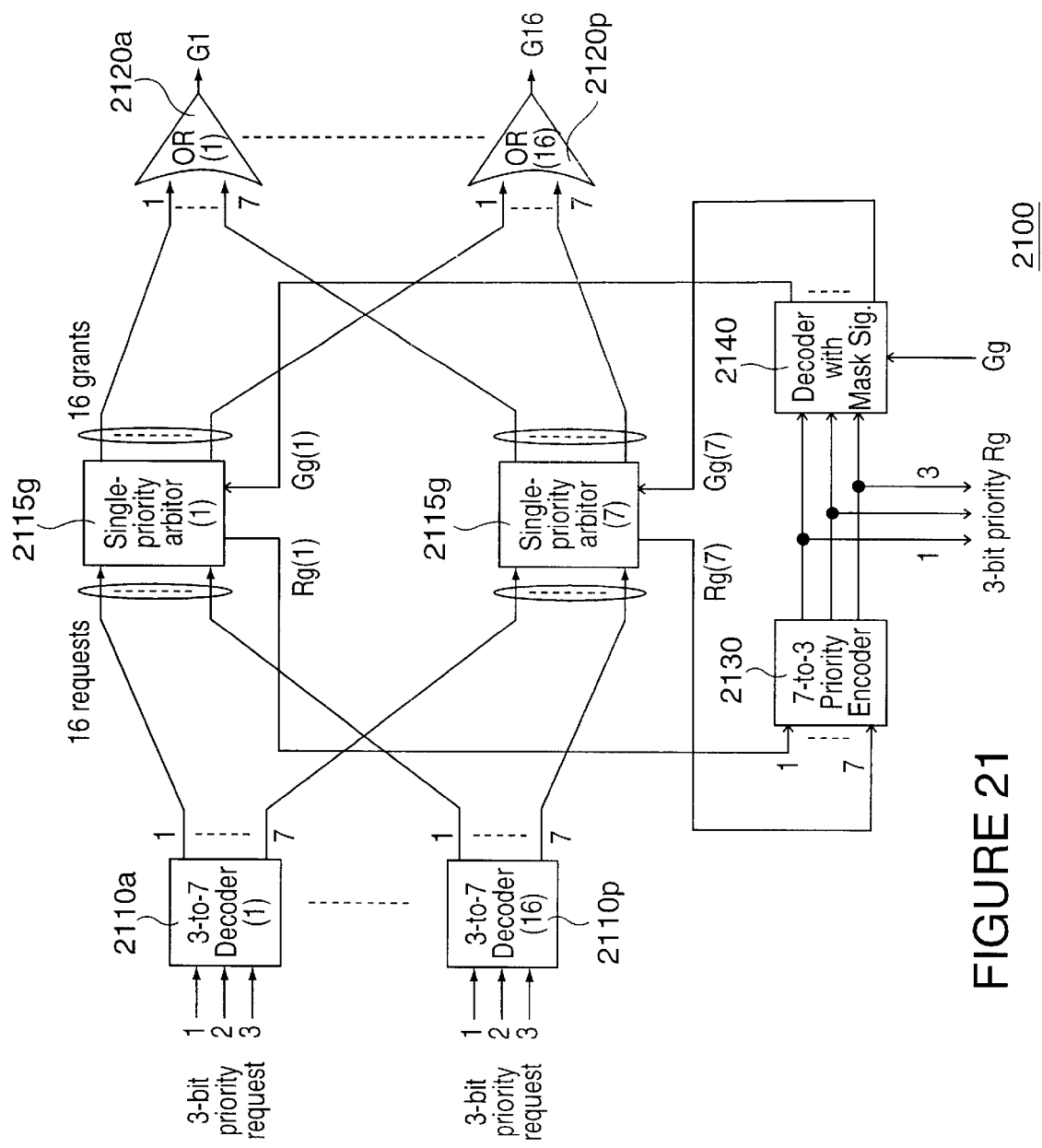
FIG. 21 is a block diagram which illustrates a technique for handling priority which may be used in the present invention.

The present invention solves multi-priority arbitration by using a group of parallel single-priority arbiters to resolve the contention at each level of priority simultaneously. Multiple single-priority arbiters are used to maintain the arbitration states (states of the flip-flops) for each level of priority, which will be changed only when an input request at this priority level is granted. A pre-processing phase and a post-processing phase are then added, as demonstrated in FIG. 21, with a multi-priority arbiter, which handles sixteen (16) inputs and seven (7) levels of priority. A 3-to-7 decoder 2110 is used at each input to decode the 3-line priority request into seven (7) single lines (Note that one three-line priority request, such as 000 for example, may indicate that no request is made.), each representing the request in the corresponding level of priority and entering the corresponding arbiter 2115 for single-priority contention resolution. An OR gate 2120 is used at each output to combine all corresponding local grants from the single-priority arbiters to produce the final grants for each input.

Meanwhile, each of the seven (7) single-priority arbiters generates a group request signal for upper layer's arbitration. It receives a group grant signal later, which indicates if this group of requests (at the corresponding level of priority) is granted or not. A 7-to-3 priority encoder 2130 collects all the group requests from the single-priority arbiters 2115 and indicates among them the highest priority with its three (3) line output. The outputs, in addition to being forwarded to the upper layer, will also be used to inhibit the arbiters with lower priority from producing any active grant. A decoder 2140 with its outputs masked by the upper-layer grant signal is used to decompose the output of the priority encoder into seven (7) single-line grant signals, each for a single-priority arbiter. Only the arbiter at the corresponding level of priority will receive the upper layer's grant signal, while all the others will receive only a LOW grant signal. Thus, the priority encoder 2130 and the decoder 2140 may be thought of, collectively, as a specific type of priority selection device.

§5.4 Methodology and Structures of Switches Using Arbiters

In this section, an exemplary terabit crossbar packet switch using the arbitration technique of the present invention is described. This exemplary switch architecture adopts a pipelining technique by separating the arbitration circuits from the data routing circuits. This enables the next-round arbitration to be performed in parallel with the current round of data transmission.

Figure 17:
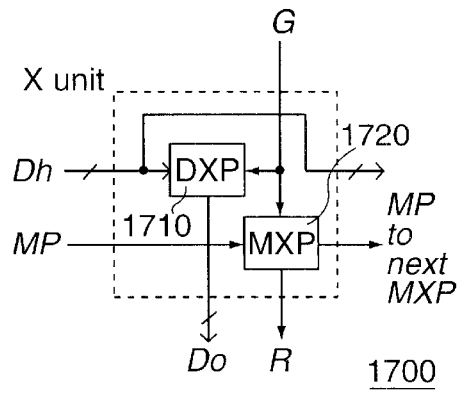
FIG. 17 is a block diagram of a crosspoint element of a crossbar switching fabric.

FIG. 17 is a block diagram of a crosspoint 1700, which is the basic unit in a crossbar switch and which corresponds to an input and output pair. That is, rows of crosspoints 1700 may be associated with input ports of the switch and columns of crosspoints 1700 may be associated with output ports of the switch. As shown, the crosspoint 1700 conceptually includes a data crosspoint (DXP) 1710 and a multicast request crosspoint (MXP) 1720. The output Do of the data crosspoint 1710 is controlled by the grant signal G. The grant signal G is LOW by default and the data crosspoint 1710 is in CROSS state such Do of the crosspoint 1700 is LOW (0). If the grant signal G turns HIGH, then the data crosspoint 1710 is toggled and the horizontal data Dh will get through.

Note that the Dh is broadcast to (though not necessarily stored at) all data crosspoints 1710 of a row of crosspoints 1700, while the multicast pattern signal MP is cascaded between adjacent multicast request crosspoints 1720 such that the multicast pattern MP is shifted into the row of crosspoints 1700. When a new multicast pattern MP is shifted into the switch chip, the multicast pattern MP bits are stored in each corresponding multicast request crosspoint 1720. Actually, bits of both the multicast pattern of a present cell and the multicast pattern of a next-in-line cell may be stored at corresponding multicast request crosspoints 1720. In this way, once all bits of the multicast pattern of the present cell are 0, the multicast pattern of the next-in-line cell can be considered while the multicast pattern of yet another cell is shifted in. This can be thought of as pipelining multicast patterns. A bit at the head of each multicast pattern signal MP, denoted by NMP (New MP), is provided to indicate whether the multicast pattern signal MP is a new multicast pattern MP. Alternatively, a single bit can be used to indicate which of the multicast patterns is to be operated on. Once all bits of the multicast pattern being operated on are O, this single bit can be toggled such that the other multicast pattern can be operated on while the multicast pattern of a next cell is shifted in. This permits the switch to decide whether the multicast pattern MP should be accepted at the switch chip. After each arbitration, the request signal (i.e. the MP bit) is updated for the next round. Depending on the new multicast pattern bit signal NMP arriving at the beginning of the next arbitration cycle, either the new multicast pattern MP or the old updated one is used. More specifically, when all bits of a multicast pattern are 0, indicating that the cell has been sent to all requested output ports, a next cell, with a new multicast pattern, is retrieved and the formerly "new" multicast pattern is considered (its NMP bit is changed).

Figure 18:
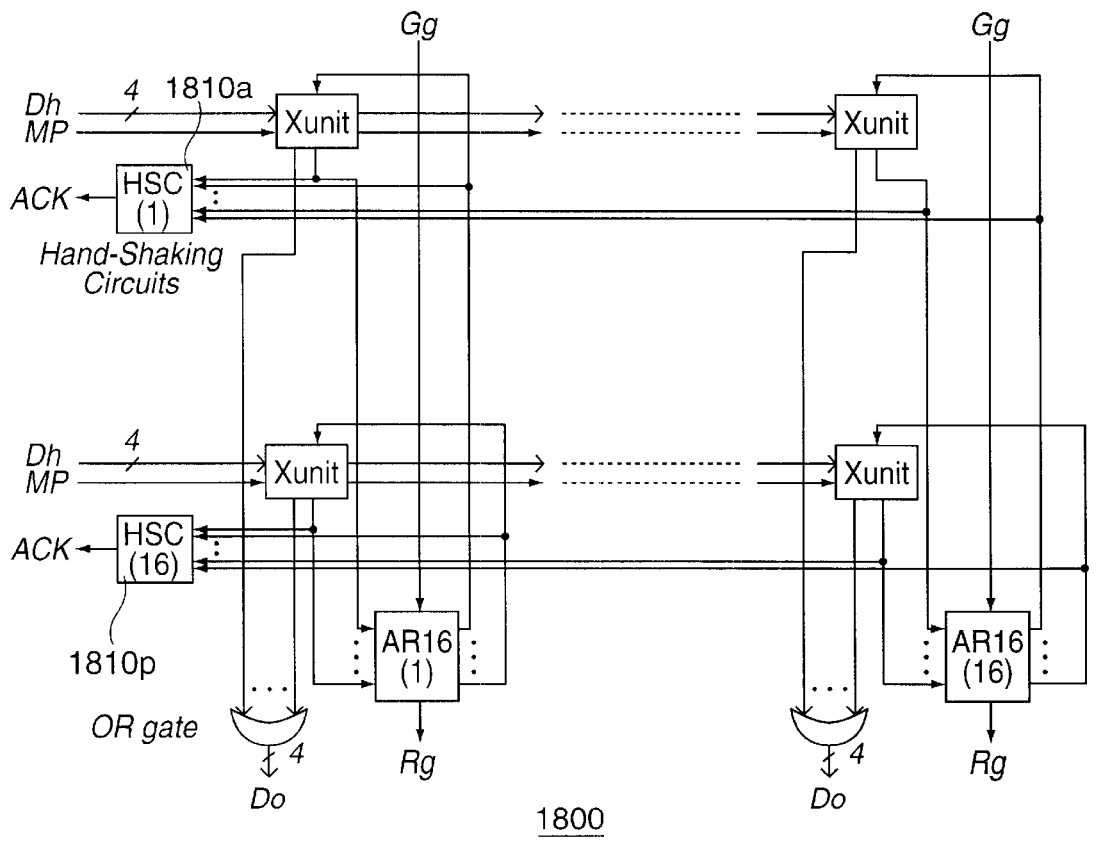
FIG. 18 is a block diagram of a sixteen-by-sixteen switch which employs sixteen-request arbiters.

FIG. 18 is a high level block diagram of a sixteen-by-sixteen switch (also referred to as a "SW16chip") 1800. The communications between an input port controller (also referred to as an "IPC") and an SW16 chip 1800 are through the following six (6) lines: (i) four data lines Dh broadcasting from the input port to all crosspoints on the same row; (ii) one Multicast Pattern (MP) line with the NMP bit at the head of the MP indicating whether it is a new MP; and (iii) one acknowledgement (ACK) signal line with two (2) bits (input serially) from the chip to the input. The number of horizontal (4 Dh, MP, ACK) and vertical (4 Do, Rg, Gg) signal pins in the chip is 192 (=6×16 incoming+6×16 outgoing).

A two-bit ACK signal, ($ACK_1$, $ACK_0$), is generated by the handshaking circuits (also referred to as "HSC") 1810 in the SW16 chip 1800. The signal specifications are as follows:

| ($ACK_1$, $ACK_0$) | IPC Action | Description |
| --- | --- | --- |
| 00 | do nothing | don't send cell nor MP |
| 01 | transmit HOL cell | contention won; port granted |
| 10 | load MP | all MP bits are zero |
| 11 | load both | |

Thus, the first bit ($ACK_1$) of the two-bit ACK signal is used for transmitting MPs and the second bit ($ACK_0$) of the two-bit ACK signal 13 used for transmitting cells.

Figure 19:
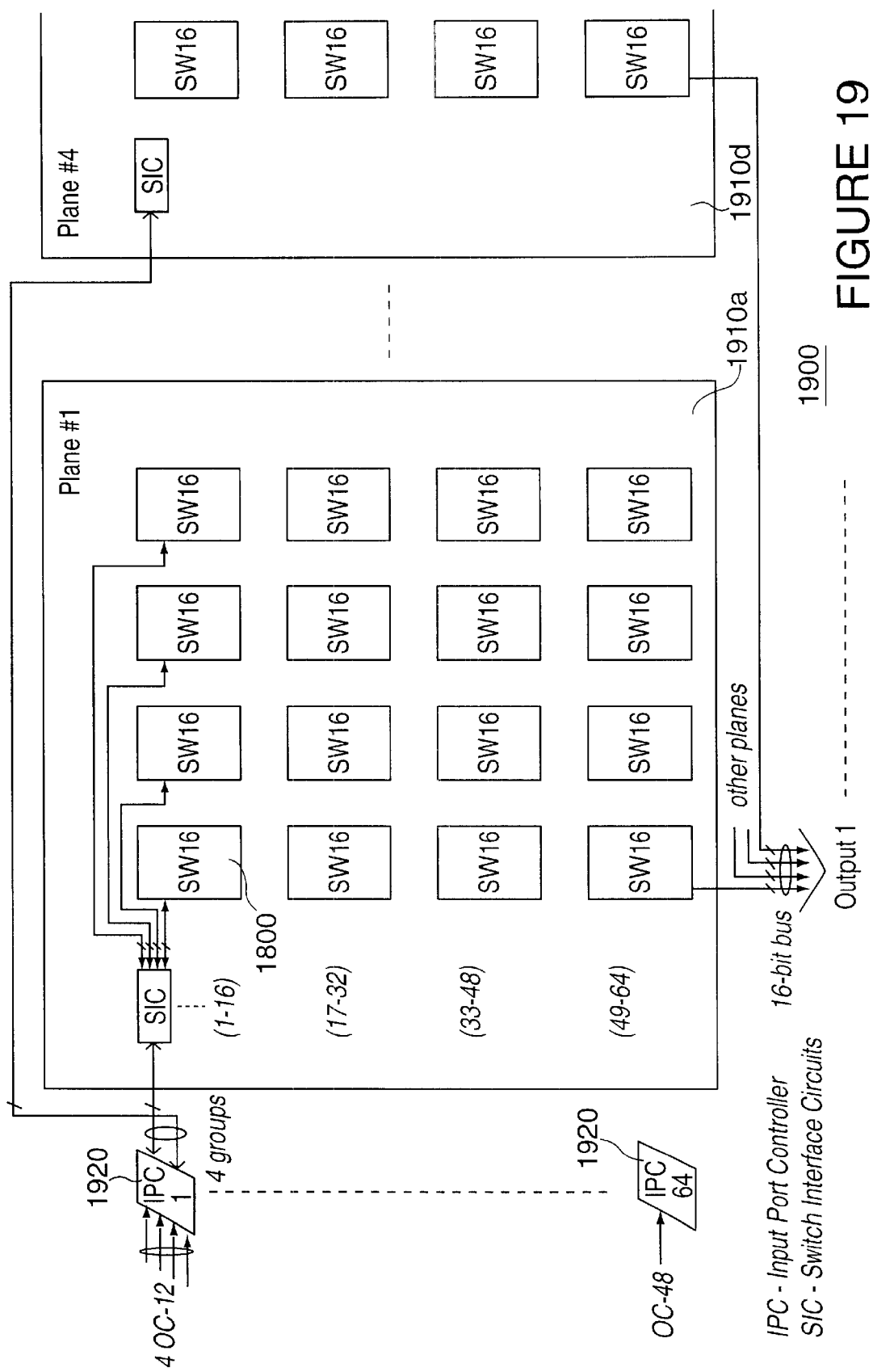
FIG. 19 is a block diagram of a large scale switch constructed from sixteen-by-sixteen switches, such as that of FIG. 18.

As shown in FIG. 19, when building a large-scale switch 1900, multiple SW16 chips 1800 are interconnected in a two-dimension array(s) 1910. Each input port controller (IPC) 1920 will receive multiple ACK signals, one from each SW16 1800. The final decision of whether the head-of-line (HOL) cell or the MP of the cell next to the HOL should be transmitted to the switch can be easily made by logically ORing $ACK_0$'s or by logically ANDing $ACK_1$'s, respectively, from the SW16 chips 1800 in the same row.

A 256-by-256 terabit multicast switch 1900 may be constructed using a speedup of two (2) and a bit slicing technique. In this example, the cell size is chosen to be 64 bytes. This cell size is used when determining the time budget for arbitration. Each 64-byte cell is sliced into four (4) 16-byte parts and is handled in parallel by four (4) switching planes 1910. In each plane, 256 SW16 chips 1800 are arranged in a two-dimension array 1900, as shown in FIG. 19. The input capacity per port in each plane is reduced to 5 Gbps/4=1.25 Gbps. With a 4-bit wide bus for data signals, the switch operation rate is 1.25 Gbps×2/4≈622 Mbps.

Figure 20:
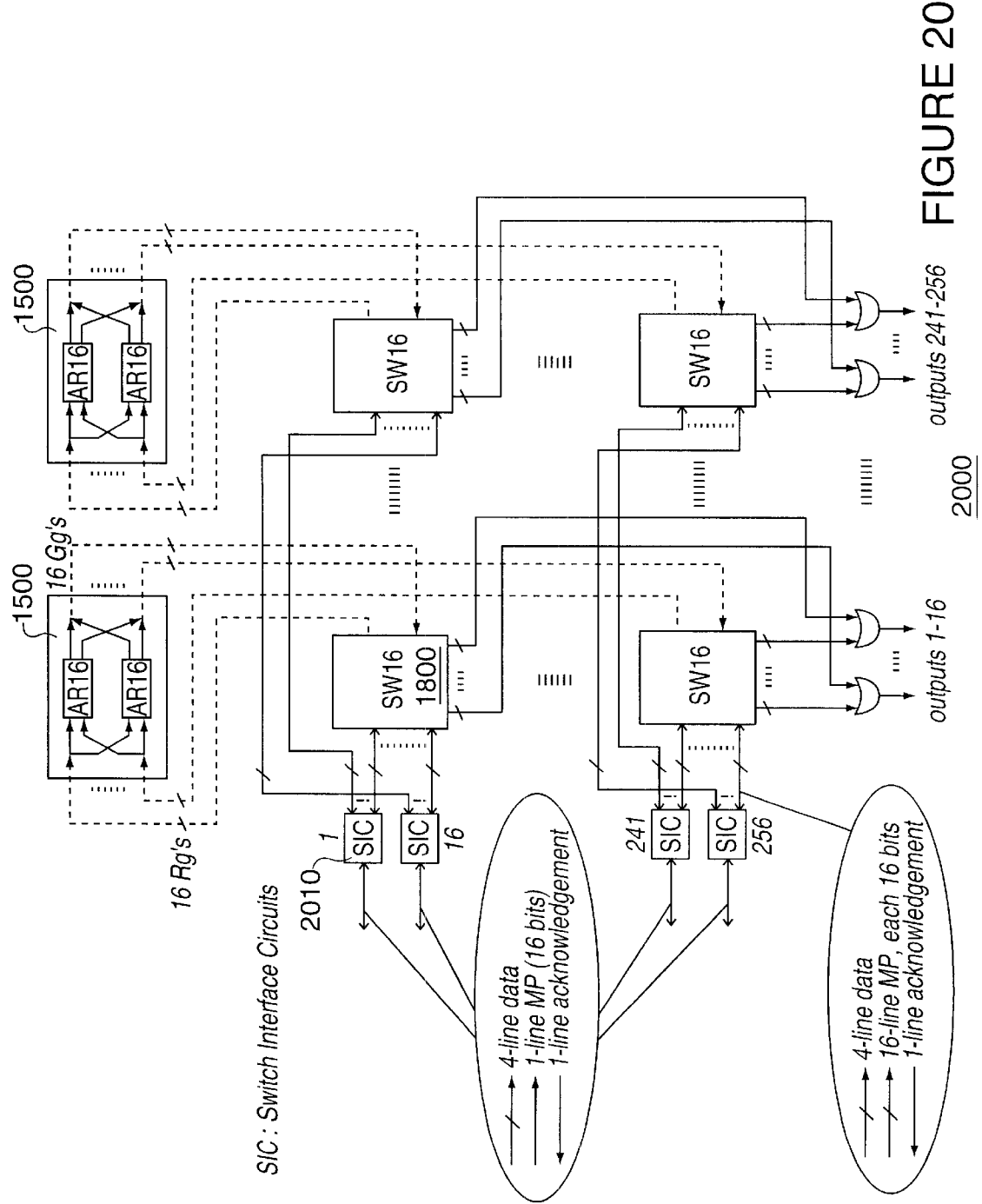
FIG. 20 is a block diagram of a 256-by-256 switch.

FIG. 20 is a high level block diagram of the 256-by-256 switch plane 2000. As shown in FIG. 20, the switch includes 256 (=16×16) SW16 chips 1800. On top of these chips, 256 AR16s arbiters 1500 are used for higher-layer arbitrations. These arbiters 1500 can be grouped into chips and built separately as shown in FIG. 20. Alternatively, they can be distributed over all SW16 chips 1800 in the same column in order to minimize the number of chips. The total number of signal pins in each SW16 will then be increased by 32 (=16×2), to 224.

Data is broadcast from an input to all SW16 chips 1800 in the same row while the multicast patterns MPs to those SW16 chips 1800 are different. A switch interface circuit (also referred to as a "SIC") 2010 is provided between each input port controller (IPC) and a row of SW16 chips 1800 to handle the data broadcast while collecting and processing the ACK signals from the SW16 chips 1800. The switch interface circuits 2010 can be either placed inside the switch plane or incorporated into the input port controllers.

With four (4) data lines, the transmission time for each cell is equal to 16 bytes/(4 bits/clock)=32 clock cycles. This defines the time budget for the arbitration and its pre and post processing. An arbitration cycle includes: (1) shifting the multicast pattern (pre-processing); (2) arbitrating; and (3) feeding back acknowledgements (post-processing).

Figure 22:
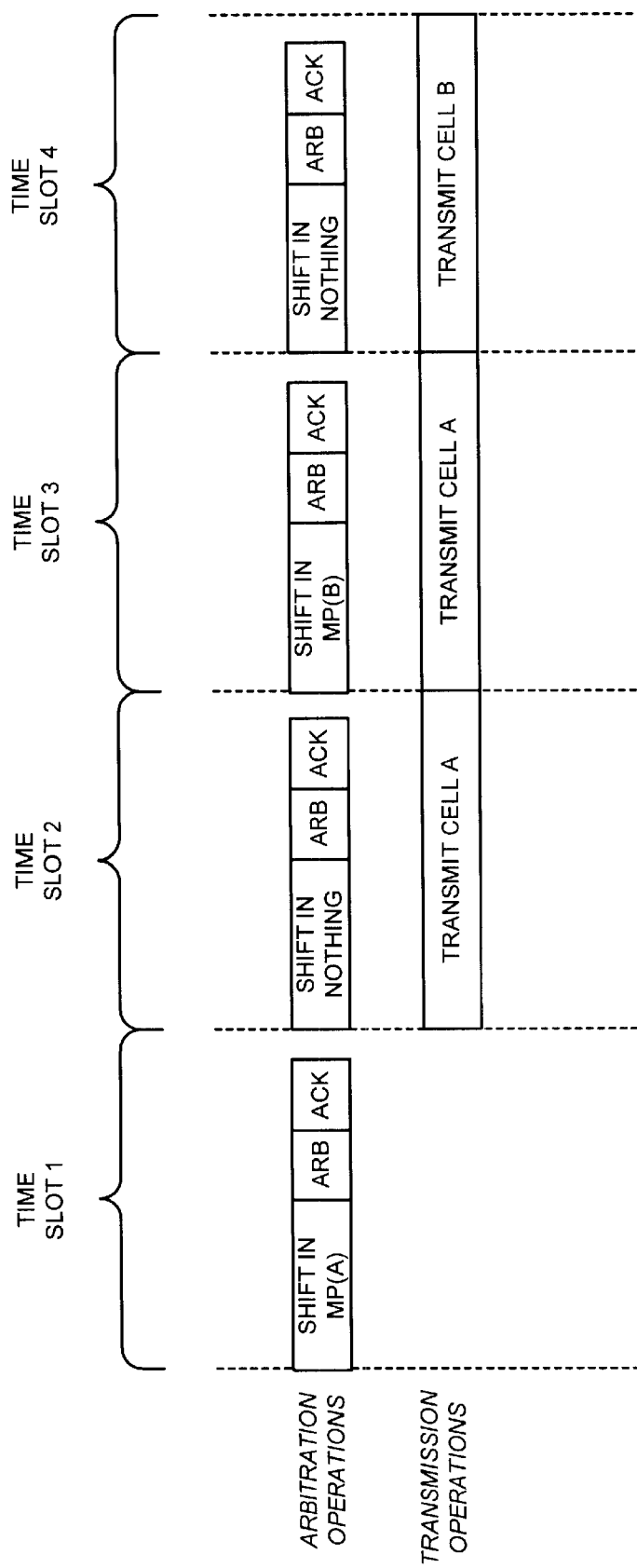
FIG. 22 is a timing diagram which illustrates the operation of an example of arbitration and cell transmission in a switch using hierarchical arbiters of the present invention.

FIG. 22 is a timing diagram which illustrates an operation of an exemplary switch using the hierarchical arbiters of the present invention. Assume that an input port holds cells A and B, having multicast patterns MP(A) and MP(B), respectively. In a first time slot, bits of the multicast pattern MP(A) of cell A are shifted into corresponding crosspoints of a row associated with the input port, an arbitration is carried out, and an acknowledge signal, corresponding to the input port and representing the results of the arbitration, is fed back to the input port. Assuming cell A is granted in at least one requested output port, but not all requested output ports (that is, not all bits of MP(A) are yet 0), in the next time slot (time slot 2), cell A is broadcast to the crosspoints of the row, no new multicast pattern is shifted in, an arbitration, based on the updated multicast pattern MP(A)' of cell A, occurs, and an acknowledge signal is fed back to the input port. Now assume that cell A granted in all of the remaining requested output port(s) (all bits of MP(A) will now be 0), in the next time slot (time slot 3), cell A is again broadcast to all crosspoints of the row. During this broadcast, bits of the multicast pattern MP(B) of cell B are shifted into corresponding crosspoints of the row, a new arbitration occurs, and an acknowledge signal is fed back. Assuming that cell B is granted in all of the requested output port(s), it will be broadcast to all crosspoints of the row in the next time slot (time slot 4). Since no more cells are at the input port, no multicast pattern is shifted in.

In the illustrated architecture, chips are assigned a multicast pattern (MP) directly. It takes just 17 bit clocks (including the NMP) for the multicast pattern MP to be shifted into a chip. The arbitration time using the arbitration technique of the present invention is only 11 gate delays (Recall FIG. 16 discussed in §5.2.3 above) for the 256×256 switch. This is less than 5 ns using the current CMOS technology.

The circuitry for generating acknowledgements is very simple. The total arbitration and feedback delay is about a few clock cycles. Therefore, it takes about 22 clock cycles for one arbitration cycle, less than 32 clock cycles required for transmitting a cell. When the pipelined architecture is used, the arbitration of a next transmission, and the current cell transmission, take place in parallel. Thus, arbitration is no longer the bottleneck limiting switch capacity.

§5.5 CONCLUSIONS

In view of the foregoing, the present invention provides methods and apparatus for an arbitration technique which may be used for output contention resolution in large capacity input-output queued switches. The arbitration technique of the present invention increases the switch throughput and optimizes delay performance for supporting multimedia services with various QoS requirements. The arbitration time of an n-input switch is proportional to $\log_4(n/2)$ when every two inputs or every two input groups are grouped at each layer.

A 256-by-256 terabit crossbar multicast packet switch can be designed using the arbitration techniques of the present invention. The design shows that the arbitration technique of the present invention can reduce the arbitration time of the 256-by-256 switch to 11 gate delays, less than 5 ns using the current CMOS technology. Thus, arbitration is no longer the bottleneck limiting the switch capacity. Indeed, it is faster than the cell transmission time.

What is claimed is:

1. An arbiter for use in a hierarchical arbitration system, the arbiter comprising:
   a) at least two inputs for receiving local request signals;
   b) a further input for receiving a group grant signal;
   c) at least two outputs for providing local grant signals;
   d) a further output for providing a group request signal;
   e) a local arbiter having at least two inputs for accepting local request signals from the at least two inputs for receiving request signals and at least two outputs for providing internal local grant signals;
   f) means for grouping local requests to generate the group request signal; and
   g) a plurality of means, each for combining the group grant signal with an associated one of the internal local grant signals to generate the local grant signals.

2. The arbiter of claim 1 wherein the means for grouping local requests logically ORs the local requests to generate the group request signal.

3. The arbiter of claim 1 wherein each of the plurality of means for combining the group grant signal with an associated one of the internal local grant signals logically ANDs the group grant signal with the associated one of the internal local grant signals to generate one of the local grant signals.

4. The arbiter of claim 1 wherein the local arbiter operates such that if a local request, favored during an arbitration cycle, is granted by a local grant signal in the arbitration cycle, a next local request will be favored in a next arbitration cycle, and if a local request, favored during an arbitration cycle, is not granted in by a local grant signal in an arbitration cycle, it will remain favored in the next arbitration cycle.

5. The arbiter of claim 1 wherein the local arbiter operates such that if a local request, favored during an arbitration cycle, is granted by a local grant signal while at least one other local requests is HIGH in the arbitration cycle, a next local request will be favored in a next arbitration cycle, if a local request, favored during an arbitration cycle, is granted by a local grant signal while all other local requests are LOW in the arbitration cycle, it will remain favored in the next arbitration cycle, and if a local request, favored during an arbitration cycle, is not granted in by a local grant signal in an arbitration cycle, it will remain favored in the next arbitration cycle.

6. A hierarchical arbitration system comprising:
   a) at least two leaf layer arbiters, each of the at least two leaf layer arbiters including
      i) at least two inputs for accepting local request signals,
      ii) at least two outputs for providing local grant signals,
      iii) a further output for providing a group request signal, and
      iv) a further input for receiving a group grant signal; and
   b) a root arbiter including
      i) inputs for accepting the group request signal from each of the at least two leaf layer arbiters, and
      ii) outputs for providing the group grant signals to each of the at least two leaf layer arbiters.

7. The hierarchical arbitration system of claim 6 wherein each of the leaf layer arbiters further include
   v) a local arbiter having at least two inputs for accepting the local request signals and at least two outputs for providing internal local grant signals;
   vi) means for grouping local requests to generate the group request signal;
   vii) a plurality of means, each for combining the received group grant signal with an associated one of the internal local grant signals to generate the local grant signals.

8. The hierarchical arbitration system of claim 7 wherein the means for grouping local requests logically ORs the local requests to generate the group request signal.

9. The hierarchical arbitration system of claim 7 wherein each of the plurality of means for combining the received group grant signal with an associated one of the internal local grant signals logically ANDs the group grant signal with the associated one of the internal local grant signals to generate one of the local grant signals.

10. The hierarchical arbitration system of claim 7 wherein, each of the local arbiters operates such that if a local request, favored during an arbitration cycle, is granted by a local grant signal in the arbitration cycle, a next local request will be favored in a next arbitration cycle, and if a local request, favored during an arbitration cycle, is not granted in by a local grant signal in an arbitration cycle, it will remain favored in the next arbitration cycle.

11. The hierarchical arbitration system of claim 7 wherein, each of the local arbiters operates such that if a local request, favored during an arbitration cycle, is granted by a local grant signal while at least one other local requests is HIGH in the arbitration cycle, a next local request will be favored in a next arbitration cycle, if a local request, favored during an arbitration cycle, is granted by a local grant signal while all other local requests are LOW in the arbitration cycle, it will remain favored in the next arbitration cycle, and if a local request, favored during an arbitration cycle, is not granted in by a local grant signal in an arbitration cycle, it will remain favored in the next arbitration cycle.

12. In a system defining a number N, where N is an integer greater than 1, of hierarchical arbitration layers, where a first layer is the lowest layer of the hierarchy, a method for arbitrating requests, the method comprising steps of:
   a) initializing a layer index to the first layer;
   b) at the first layer, accepting request signals;
   c) incrementing the layer index;
   d) determining whether or not the layer index equals the number N;
   e(1) if the layer index does not equal the number N,
      i) grouping the accepted request signals and defining a group request signal for each group; and
   e(2) if the layer index is equal to the number N,
      i) determining grant signals,
      ii) decrementing the layer index,
      iii) determining internal grant signals,
      iv) determining grant signals by combining an associated one of the grant signals from the next higher layer with each of the internal grant signals, and
      v) determining whether the layer index is 1,
      vi(a) if the layer index is 1, terminating the process, and
      vi(b) if the layer index is not 1, repeating steps e(2)(ii) through e(2)(vi).

13. The method of claim 12 wherein, in the step of grouping the accepted request signals and defining a group request signal for each group, each of the group request signals are defined by logically ORing grouped request signals.

14. The method of claim 12 wherein, in the step of determining grant signals, the grant signals are determined by logically ANDing an associated one of the grant signals from the next higher layer with each of the internal grant signals.

15. The method of claim 12 wherein, in the step of determining initial grant signals, if a local request, favored during an arbitration cycle, is granted by a local grant signal in the arbitration cycle, a next local request will be favored in a next arbitration cycle, and if a local request, favored during an arbitration cycle, is not granted in by a local grant signal in an arbitration cycle, it will remain favored in the next arbitration cycle.

16. The method of claim 12 wherein, in the step of determining initial grant signals, if a local request, favored during an arbitration cycle, is granted by a local grant signal while at least one other local requests is HIGH in the arbitration cycle, a next local request will be favored in a next arbitration cycle, if a local request, favored during an arbitration cycle, is granted by a local grant signal while all other local requests are LOW in the arbitration cycle, it will remain favored in the next arbitration cycle, and if a local request, favored during an arbitration cycle, is not granted in by a local grant signal in an arbitration cycle, it will remain favored in the next arbitration cycle.

17. In a system defining a number N, where N is an integer greater than 1, of hierarchical arbitration layers, where a first layer is the lowest layer of the hierarchy, a method for arbitrating requests, the method comprising steps of:
   a) initializing a layer index to the first layer;
   b) at the first layer, accepting request signals;
   c) incrementing the layer index;
   d) determining whether or not the layer index equals the number N;
   e(1) if the layer index does not equal the number N,
      i) grouping the accepted request signals and defining a group request signal for each group; and
   e(2) if the layer index is equal to the number N,
      i) determining grant signals,
      ii) decrementing the layer index,
      iii) determining internal grant signals,
      iv) determining whether the layer index is 1, and
      v(a) if the layer index is 1, updating the internal grant signals by combining each of them with associated grant signals from the N−1 higher layer(s) of the hierarchy, and
      v(b) if the layer index is not 1, repeating steps e(2) (ii) through e(2) (v).

18. The method of claim 17 wherein, in the step of grouping the accepted request signals and defining a group request signal for each group, each of the group request signals are defined by logically ORing grouped request signals.

19. The method of claim 17 wherein, in the step of determining grant signals, the grant signals are determined by logically ANDing associated ones of the grant signals from the N−1 higher layer(s) of the hierarchy with each of the internal grant signals.

20. The method of claim 17 wherein, in the step of determining initial grant signals, if a local request, favored during an arbitration cycle, is granted by a local grant signal in the arbitration cycle, a next local request will be favored in a next arbitration cycle, and if a local request, favored during an arbitration cycle, is not granted in by a local grant signal in an arbitration cycle, it will remain favored in the next arbitration cycle.

21. The method of claim 17 wherein, in the step of determining initial grant signals, if a local request, favored during an arbitration cycle, is granted by a local grant signal while at least one other local requests is HIGH in the arbitration cycle, a next local request will be favored in a next arbitration cycle, if a local request, favored during an arbitration cycle, is granted by a local grant signal while all other local requests are LOW in the arbitration cycle, it will remain favored in the next arbitration cycle, and if a local request, favored during an arbitration cycle, is not granted in by a local grant signal in an arbitration cycle, it will remain favored in the next arbitration cycle.

22. An arbitration system for handling up to four requests, the arbitration system comprising:
   a) four inputs for accepting request signals;
   b) a fifth input for accepting a group grant signal;
   c) four outputs for providing grant signals;
   d) a fifth output for providing a group request signal;
   e) a first arbiter having
      i) two inputs for accepting request signals from a first two of the four inputs for accepting request signals,
      ii) two outputs for providing grant signals to a first two of the four outputs for providing grant signals,
      iii) an third input coupled with the fifth input for accepting the group grant signal, and
      iv) a fourth input for accepting a second group grant signal;
   f) a second arbiter having
      i) two inputs for accepting request signals from a second two of the four inputs for accepting request signals,
      ii) two outputs for providing grant signals to a second two of the four outputs for providing grant signals,
      iii) an third input coupled with the fifth input for accepting the group grant signal, and
      iv) a fourth input for accepting a third group grant signal;
   g) a third arbiter having
      i) two inputs, each for accepting a grouped request signal,
      ii) a third input coupled with the fifth input for accepting the group grant signal,
      iii) a first output coupled with the fourth input of the first arbiter, and
      iv) a second output coupled with the fourth input of the second arbiter;
   h) a first logical OR element having
      i) four inputs, each coupled with a respective one of the four inputs for accepting request signals, and
      ii) an output coupled with the fifth output for providing a group request signal;
   i) a second logical OR element having
      i) two inputs, each coupled with a respective one of the first two of the four inputs for accepting request signals, and
      ii) an output coupled with a first one of the two inputs of the third arbiter; and
   j) a third logical OR element having
      i) two inputs, each coupled with a respective one of the second two of the four inputs for accepting request signals, and
      ii) an output coupled with a second one of the two inputs of the third arbiter.

23. An M-by-N switch, where N is an integer greater than one and M is another integer greater than one, the M-by-N switch comprising:
 a) M input port controllers for receiving incoming cells;
 b) N output port controllers for receiving outgoing cells;
 c) N hierarchical arbitration systems, each the N hierarchical arbitration systems being associated with one of the N output ports and having
  i) at least two leaf layer arbiters, each of the at least two leaf layer arbiters including
   A) at least two inputs for accepting local request signals,
   B) at least two outputs for providing local grant signals,
   C) a further output for providing a group request signal, and
   D) a further input for receiving a group grant signal; and
  ii) a root arbiter including
   A) inputs for accepting the group request signal from each of the at least two leaf layer arbiters, and
   B) outputs for providing the group grant signals to each of the at least two leaf layer arbiters; and
 d) switching fabric including M rows and N columns of crosspoints, wherein each of the M rows is associated with one of the M input port controllers, wherein each of the N columns is associated with one of the N output port controllers and one of the N hierarchical arbitration systems.

24. The M-by-N switch of claim 23 wherein each of the M crosspoints of a row is coupled with an associated input of an associated leaf arbiter of the hierarchical arbiter associated with the row.

25. The M-by-N switch of claim 24 wherein each cell has an associated N bit multicast pattern, and
 wherein, if a bit of a previously stored multicast pattern associated with a head-of-line cell is high, the crosspoint receiving the associated cell submits a request to an arbiter associate with its column.

26. The M-by-N switch of claim 25 wherein, if the arbiter grants the request, the associated input port controller broadcasts its head-of-line cell to each of the crosspoints of an associated row.

27. The M-by-N switch of claim 26 further comprising M handshake circuits arranged between the input port controllers and their associated rows of crosspoints, wherein each of the M handshake circuits informs its associated input port controller whether to transmit the head-of-line cell or whether to load a next multicast pattern.

28. An xM-by-N switch, where N is an integer greater than one, x is another integer greater than one, and M is yet another integer greater than one, the xM-by-N switch comprising:
 a) xM input port controllers for receiving incoming cells;
 b) N output port controllers for receiving outgoing cells;
 c) xN hierarchical arbitration systems, each x the xN hierarchical arbitration systems being associated with one of the N output ports, and each of the xN hierarchical arbitration systems having
  i) at least two leaf layer arbiters, each of the at least two leaf layer arbiters including
   A) at least two inputs for accepting local request signals,
   B) at least two outputs for providing local grant signals,
   C) a further output for providing a group request signal, and
   D) a further input for receiving a group grant signal; and
  ii) a root arbiter including
   A) inputs for accepting the group request signal from each of the at least two leaf layer arbiters, and
   B) outputs for providing the group grant signals to each of the at least two leaf layer arbiters;
 d) N row arbiters, each of the N row arbiters receiving request signals from x associated hierarchical arbitration systems and providing grant signals to the x associated hierarchical arbitration systems; and
 e) switching fabric including xM rows and N columns of crosspoints, wherein each of the xM rows is associated with one of the xM input port controllers, wherein each of the N columns is associated with one of the N output port controllers and one of the N row arbiters.

29. The xM-by-N switch of claim 28 wherein each of the row arbiters includes
 i) at least two leaf layer arbiters, each of the at least two leaf layer arbiters including
  A) at least two inputs for accepting request signals from the x hierarchical arbitration systems of an associated row,
  B) at least two outputs for providing local grant signals,
  C) a further output for providing a group request signal, and
  D) a further input for receiving a group grant signal; and
 ii) a root arbiter including
  A) inputs for accepting the group request signal from each of the at least two leaf layer arbiters, and
  B) outputs for providing the group grant signals to each of the at least two leaf layer arbiters.

30. An N-request arbitration system for handling cells which may have one of P priority levels, the arbitration system comprising:
 a) P hierarchical arbitration systems, each of the P hierarchical arbitration systems being associated with a priority level and having
  i) at least two leaf layer arbiters, each of the at least two leaf layer arbiters including
   A) at least two inputs for accepting local request signals,
   B) at least two outputs for providing local grant signals,
   C) a further output for providing a group request signal, and
   D) a further input for receiving a group grant signal; and
  ii) a root arbiter including
   A) inputs for accepting the group request signals from each of the at least two leaf layer arbiters,
   B) outputs for providing the group grant signals to each of the at least two leaf layer arbiters, and
   C) means for combining the group request signals to generate a priority group request;
 b) a priority selection device having inputs for receiving P priority group request from the P hierarchical arbitration systems and having P outputs for providing a priority grant signal to each of the P hierarchical arbitration systems; and
 c) N, P-input OR gates, each of the N, P-input OR gates having an associated one of its P inputs coupled with an associated one of N grant signals from an associated one of the P hierarchical arbitration systems.

31. The N-request arbitration system of claim 30 wherein the priority selection device sets a grant signal associated with the highest priority HIGH priority group request to HIGH and sets all other grant signals LOW.

* * * * *